(12) United States Patent
Shipman

(10) Patent No.: US 10,013,075 B2
(45) Date of Patent: *Jul. 3, 2018

(54) ILLUMINATED KEYBOARD

(71) Applicant: Michael Shipman, Newport Coast, CA (US)

(72) Inventor: Michael Shipman, Newport Coast, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/251,495

(22) Filed: Aug. 30, 2016

(65) Prior Publication Data

US 2016/0370873 A1    Dec. 22, 2016

Related U.S. Application Data

(63) Continuation of application No. 14/541,908, filed on Nov. 14, 2014, which is a continuation of application
(Continued)

(51) Int. Cl.
*H03K 17/94* (2006.01)
*H03M 11/00* (2006.01)
(Continued)

(52) U.S. Cl.
CPC .......... *G06F 3/0202* (2013.01); *G06F 3/0238* (2013.01)

(58) Field of Classification Search
CPC .... G06F 3/0202; G06F 1/1662; G06F 3/0219; H01H 2219/062; H01H 13/83; H01H 2219/018; H01H 2219/06; H01H 2219/039; H01H 2219/044; H01H 2221/07; H01H 13/70; H01H 2219/014; H01H 2219/037; H01H 2219/056; H01H 2209/082; H01H 9/181; H01H 9/182; H04M 1/22;
(Continued)

(56) References Cited

U.S. PATENT DOCUMENTS 3,886,544 A    5/1975    Narodny
3,934,245 A    1/1976    Mueller
(Continued)

FOREIGN PATENT DOCUMENTS

EP    1 329 919 A1    7/2003
EP    1 028 443 B1    8/2003
(Continued)

*Primary Examiner* — Emily C Terrell
(74) *Attorney, Agent, or Firm* — David Duckworth

(57) ABSTRACT

A light guide is provided for illuminating innumerable constructions, but which is ideally suited for illuminating the keys of a keyboard. The light guide includes a translucent planar plate having a top, a bottom and sides. Further, the light guide includes one or more cavities which project upwardly into the translucent plate from its bottom surface. The cavities are hollow or filled with a translucent material so that the translucent plate and the one or more cavities form translucent interfaces where the cavities interface with the plate. The light guide also includes a reflector which covers the plate bottom and cavity openings. Light produced by a light source, preferably in the form of one or more LEDs, is transmitted to and through the translucent plate until striking the plate-cavity interfaces where the light is refracted into the cavities' interior or reflected upwardly to the plate's upper surface.

6 Claims, 18 Drawing Sheets

Related U.S. Application Data

No. 13/374,771, filed on Jan. 12, 2012, now Pat. No. 8,890,720, which is a continuation of application No. 12/386,075, filed on Apr. 13, 2009, now abandoned, which is a continuation-in-part of application No. 11/974,670, filed on Oct. 15, 2007, now abandoned, which is a continuation-in-part of application No. 11/038,308, filed on Jan. 18, 2005, now Pat. No. 7,283,066, which is a continuation-in-part of application No. 10/294,396, filed on Nov. 14, 2002, now Pat. No. 6,918,677, which is a continuation-in-part of application No. 09/899,960, filed on Jul. 6, 2001, now abandoned, which is a continuation-in-part of application No. 09/836,628, filed on Apr. 16, 2001, now Pat. No. 6,467,924, which is a continuation-in-part of application No. 09/500,735, filed on Feb. 9, 2000, now Pat. No. 6,217,183, which is a continuation of application No. 09/396,141, filed on Sep. 15, 1999, now abandoned.

(51) Int. Cl.
| | | |
|---|---|---|
| *G08C 19/12* | (2006.01) | |
| *H04L 17/02* | (2006.01) | |
| *H01H 9/00* | (2006.01) | |
| *G06F 3/02* | (2006.01) | |
| *G09G 5/00* | (2006.01) | |
| *B41J 5/00* | (2006.01) | |
| *G06F 3/00* | (2006.01) | |
| *G06F 3/023* | (2006.01) | |

(58) Field of Classification Search
CPC ..... H03K 17/9638; H03K 2217/96042; H03K 2217/9655
USPC ........ 341/22, 20, 29, 30, 173, 187; 200/314; 345/170, 168; 400/472; 380/52; 708/142
See application file for complete search history.

(56) References Cited

U.S. PATENT DOCUMENTS

| | | | |
|---|---|---|---|
| 4,060,703 | A | 11/1977 | Everett, Jr. |
| 4,124,879 | A | 11/1978 | Schoemer |
| 4,177,501 | A | 12/1979 | Karlin |
| 4,320,268 | A | 3/1982 | Brown |
| 4,449,024 | A | 5/1984 | Stracener |
| 4,489,227 | A | 12/1984 | Lamarche |
| 4,493,958 | A | 1/1985 | Hamilton et al. |
| 4,670,633 | A | 6/1987 | Kaiwa et al. |
| 4,727,357 | A | 2/1988 | Curtin et al. |
| 4,806,908 | A | 2/1989 | Krupnik |
| 4,811,175 | A | 3/1989 | DeSmet |
| D311,913 | S | 11/1990 | Schaum |
| 5,029,046 | A | 7/1991 | Kameda |
| 5,034,602 | A | 7/1991 | Garcia, Jr. et al. |
| 5,045,755 | A | 9/1991 | Appelberg |
| 5,097,396 | A | 3/1992 | Myers |
| 5,384,459 | A | 1/1995 | Patino et al. |
| 5,420,761 | A | 5/1995 | DuNah et al. |
| 5,432,684 | A | 7/1995 | Fye et al. |
| 5,491,313 | A | 2/1996 | Bartley et al. |
| 5,510,782 | A | 4/1996 | Norris et al. |
| 5,512,718 | A | 4/1996 | Larose |
| 5,515,045 | A | 5/1996 | Tak |
| 5,542,016 | A | 7/1996 | Kaschke |
| 5,612,692 | A | 3/1997 | Dugas et al. |
| 5,684,279 | A | 11/1997 | Burgett |
| 5,684,513 | A | 11/1997 | Decker |
| 5,747,756 | A | 5/1998 | Boedecker |
| 5,797,482 | A | 8/1998 | LaPointe et al. |
| 5,807,002 | A | 9/1998 | Tsai |
| 5,815,225 | A | 9/1998 | Nelson |
| 5,871,088 | A | 2/1999 | Tanabe |
| 5,899,553 | A | 5/1999 | Howell |
| 5,911,317 | A | 6/1999 | Tsai |
| 5,936,554 | A | 8/1999 | Stanek |
| 5,975,711 | A | 11/1999 | Parker et al. |
| 5,977,901 | A | 11/1999 | Fenner |
| 5,993,019 | A | 11/1999 | Kline et al. |
| 6,006,118 | A | 12/1999 | Stephenson |
| 6,040,822 | A | 3/2000 | Decker |
| 6,084,190 | A | 7/2000 | Kenmochi |
| 6,127,183 | A | 10/2000 | Ivarsson et al. |
| 6,179,432 | B1 | 1/2001 | Zhang et al. |
| 6,199,996 | B1 | 3/2001 | Katrinecz, Jr. et al. |
| 6,270,229 | B1 | 8/2001 | Chien |
| 6,284,988 | B1 | 9/2001 | Watanabe et al. |
| 6,322,229 | B1 | 11/2001 | Chan et al. |
| 6,448,520 | B1 | 9/2002 | Inoue |
| 6,554,442 | B2 | 4/2003 | Chou |
| 6,590,508 | B1 | 7/2003 | Howell et al. |
| 6,608,271 | B2 | 8/2003 | Duarte |
| 6,609,805 | B1 | 8/2003 | Nelson |
| D484,511 | S | 12/2003 | Registre |
| 6,667,931 | B2 | 12/2003 | Lafage |
| 6,686,549 | B2 | 2/2004 | Douzono et al. |
| 6,704,004 | B1 | 3/2004 | Ostergard et al. |
| D491,562 | S | 6/2004 | Chou |
| 6,753,793 | B1 | 6/2004 | Kako et al. |
| 6,773,128 | B2 | 8/2004 | Katrinecz, Jr. et al. |
| 6,797,902 | B2 | 9/2004 | Farage et al. |
| 6,803,903 | B1 | 10/2004 | Ostergard et al. |
| 6,860,612 | B2 | 3/2005 | Chiang et al. |
| 7,172,303 | B2 | 2/2007 | Shipman et al. |
| 7,193,563 | B2 | 3/2007 | Shipman |
| 7,239,303 | B2 | 7/2007 | Liao et al. |
| 7,388,167 | B2 | 6/2008 | Liao et al. |
| 2005/0073824 | A1 | 4/2005 | Kuo |
| 2009/0284397 | A1* | 11/2009 | Lee ........................ G06F 3/0238 341/23 |

FOREIGN PATENT DOCUMENTS

| | | |
|---|---|---|
| JP | 02-106827 | 4/1990 |
| JP | 2000-299032 | 10/2000 |
| WO | WO 98/48394 | 10/1998 |

\* cited by examiner

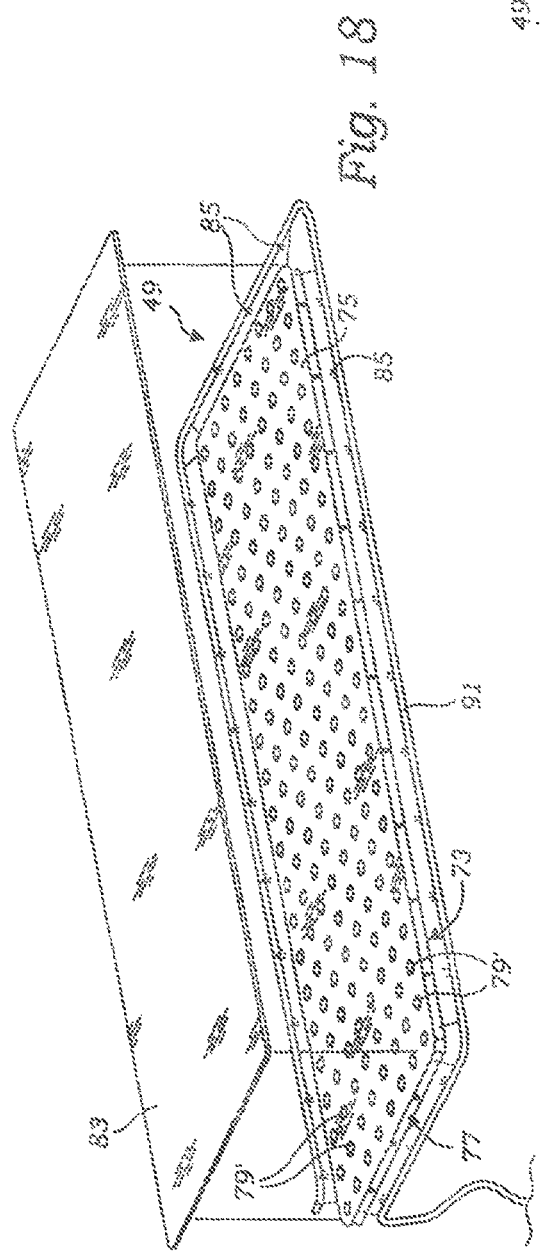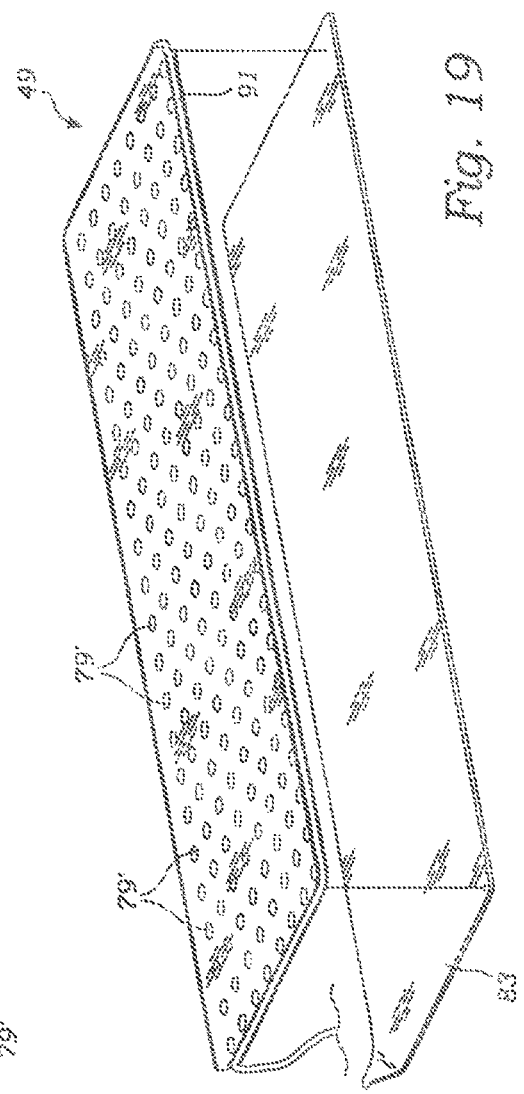

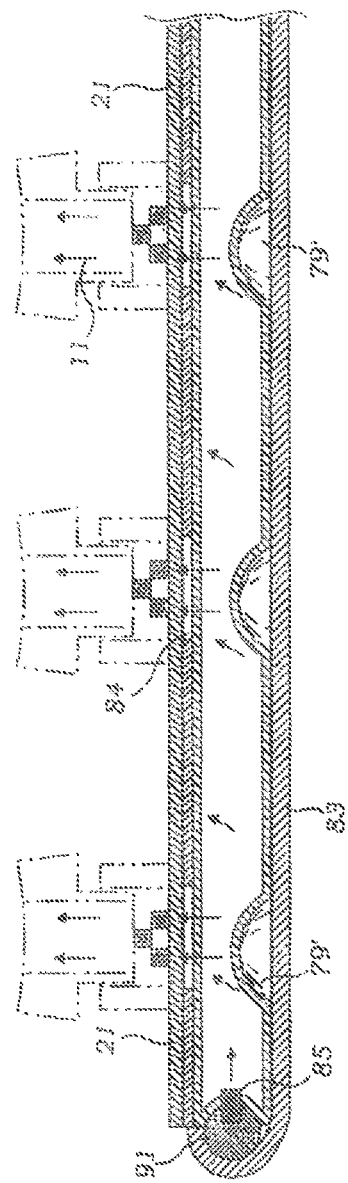
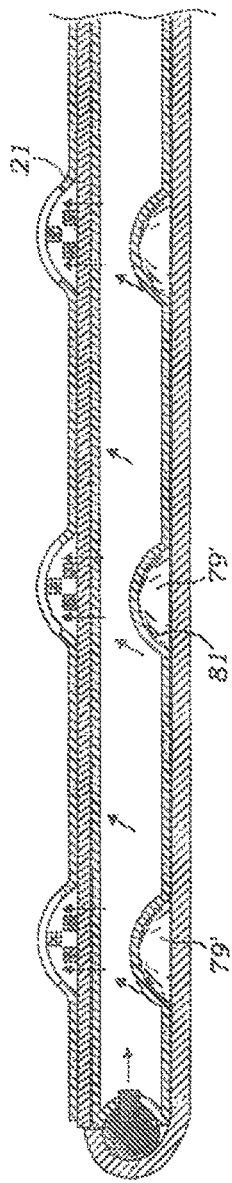

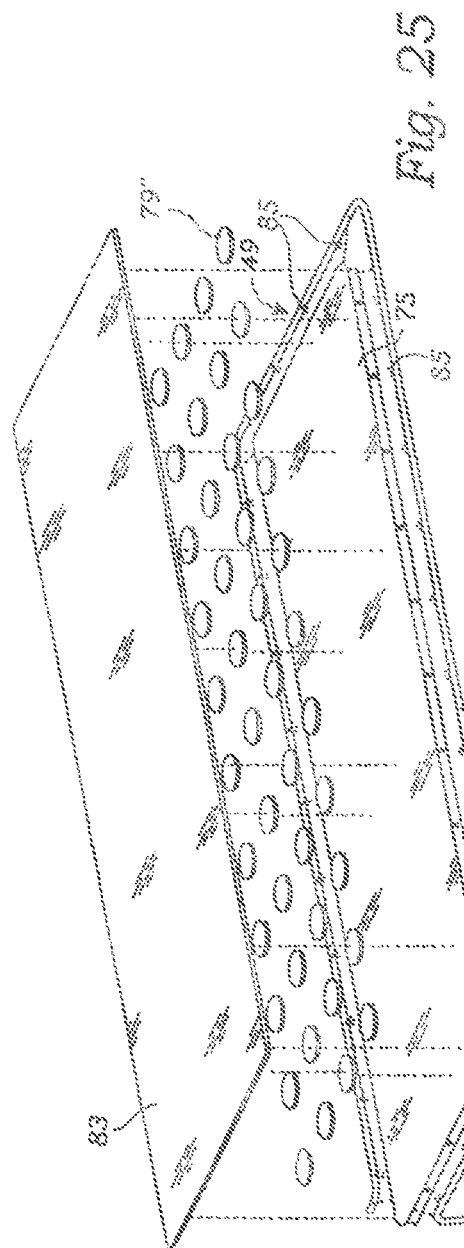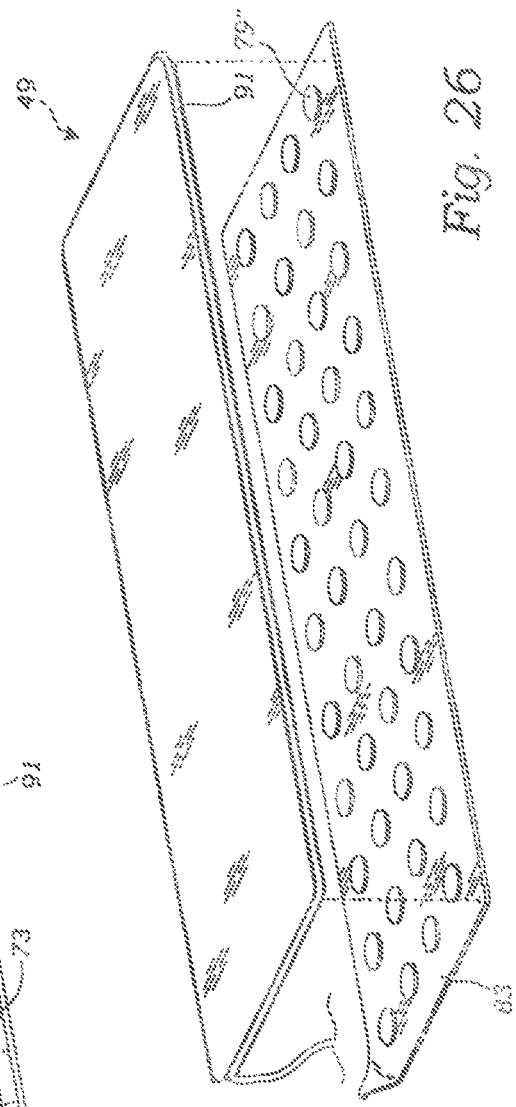

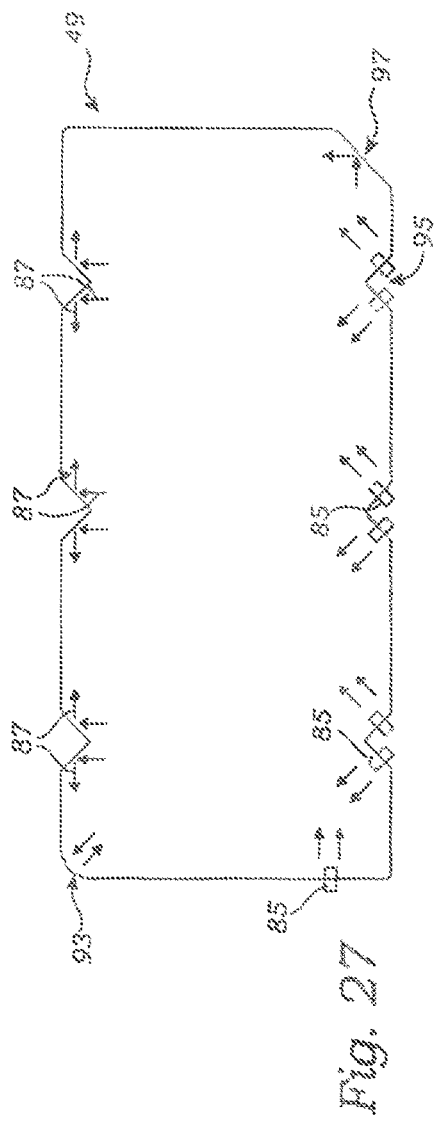
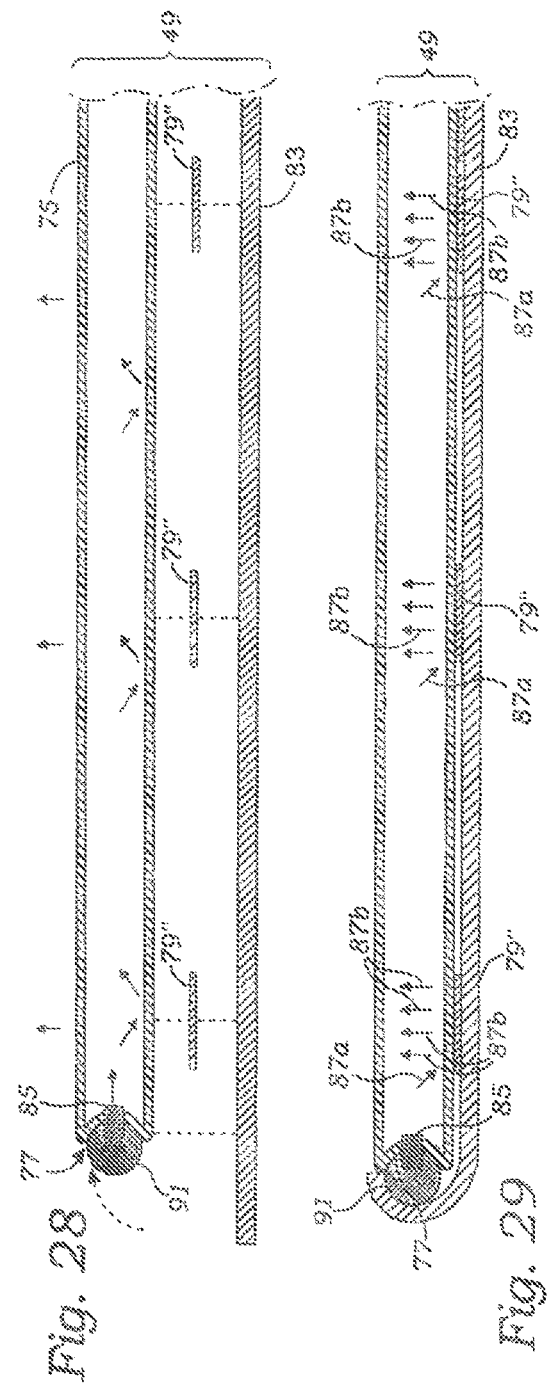
Fig. 27  Fig. 28  Fig. 29

ILLUMINATED KEYBOARD

RELATED APPLICATIONS

This application is a continuation application of U.S. patent application Ser. No. 14/541,908 filed Nov. 14, 2014, which in turn is a continuation application of U.S. Ser. No. 13/374,771 filed on Jan. 12, 2012, now U.S. Pat. No. 8,890,720 issued Nov. 18, 2014, which in turn is a continuation application of U.S. patent application Ser. No. 12/386,075 filed on Apr. 13, 2009, which in turn is a continuation-in-part of U.S. patent application Ser. No. 11/974,670 filed Oct. 15, 2007, which in turn is a continuation-in-part application of U.S. patent application Ser. No. 11/038,308 filed Jan. 18, 2005, now U.S. Pat. No. 7,283,066 issued Oct. 16, 2007, which in turn is a continuation-in-part application of U.S. patent application Ser. No. 10/294,396 filed on Nov. 14, 2002, now U.S. Pat. No. 6,918,677 issued Jul. 19, 2005, which in turn is a continuation-in-part application of U.S. patent application Ser. No. 09/899,960 filed on Jul. 6, 2001, now abandoned, which in turn is a continuation-in-part application of U.S. patent application Ser. No. 09/836,628 filed on Apr. 16, 2001, now U.S. Pat. No. 6,467,924 issued Oct. 22, 2002, which in turn is a continuation-in-part application of U.S. patent application Ser. No. 09/500,735, filed on Feb. 9, 2000, now U.S. Pat. No. 6,217,183 issued Apr. 17, 2001, which in turn is a continuation application of U.S. patent application Ser. No. 09/396,141, filed on Sep. 15, 1999, now abandoned.

BACKGROUND OF THE INVENTION

The present invention relates generally to keyboards, including typewriter and computer keyboards.

More specifically, the present invention relates to keyboards having illuminated key members.

Conventional keyboards include a plurality of key members which display symbols, such as alphanumeric keys, on their top surfaces. Moreover, typical modern keyboards, such as those found in cellular telephones, Automatic Teller Machines (ATMs), electric typewriters and computers utilize a make-and-break electrical circuit which is activated by depression of a key member for identifying a particular symbol embedded on the top of the key member.

A problem with prior art keyboards is that it is often difficult to discern the symbol appearing on the top of the key member under poor lighting conditions. This causes the keyboard operator to memorize the key locations or to strain their eyes to operate the keys of the keyboard under low light conditions. This has become a much greater problem in present day society as keyboards have become necessary for everyday use and as keyboard use is not limited primarily to operation by workers in business offices as in the past. As a result of this expansion of keyboard use, more and more operators have less training on keyboards, and correspondingly many keyboard operators utilize a "hunt and peck" style of keyboard operation.

Moreover, the advent of laptop and notebook computers has resulted in the use of keyboards at places where they were not previously operated. Often these places provide limited light making it difficult for keyboard operators to quickly and easily operate the keyboard. For example, it is a common sight on commercial aircraft to see a passenger slowly hunt and peck at their keyboards continuously looking at the key members to verify that they are in fact pressing the correct keys.

Accordingly, it is clear that there is a need for an apparatus that makes keyboard key members more discernable in low light conditions. Backlighting is commonly used in rubber keypads, membrane switches, rigid panels and the like to make them more visible and discernable. These keypad panels typically make use of light emitting crystals (LECs), light emitting diodes (LEDs), and/or fiber optics for this purpose. Most prior backlit keyboards utilize a light source which is typically transmitted via a fiber optic cable to the key members of a keypad. For example, U.S. Pat. No. 5,034,602 issued to Garcia, Jr. et al. discloses an optically activated keyboard which uses fiber optic cables to transmit light to translucent key members. The light is transmitted through the translucent key members where it is emitted from the top of the key cap. Similarly, U.S. Pat. No. 3,886,544 issued to Narodny and U.S. Pat. No. 5,097,396 issued to Myers disclose keyboards which use backlighting. Each key member in connection to a fiber optic cable which transmits light to a respective key member which thereafter transmits light from the top of the key cap. Additional keyboard and keypad techniques include the LED and LEC backlighting commonly utilized for alarm activator and deactivator keypads wherein each key includes a separate LED or LEC structure embedded in or behind the key member. Unfortunately, it is extremely difficult to route fiber optics to the keyboard keys of today's computer systems. For example, it would be particularly difficult to route fiber optic cables and provide a light source to the key members of today's notebook computers and palm-sized computer systems.

In addition, the light sources for use with prior art backlit keyboards require substantial power and in some cases, a fan for cooling which draws additional power. These constructions are prohibitive for portable computers such as laptop and notebook computers which draw on the power of a rechargeable battery and where power is at a premium.

Recently, the present named inventor, Michael Shipman, developed numerous lighted keyboard and light pipe constructions which are the subject of U.S. Pat. No. 6,217,183 issued on Apr. 17, 2001; U.S. Pat. No. 6,467,924 issued on Oct. 22, 2002; U.S. Pat. No. 6,918,677 issued on Jul. 19, 2005; U.S. Pat. No. 7,172,303 issued on Feb. 6, 2007; U.S. Pat. No. 7,193,535 issued on Mar. 20, 2007; U.S. Pat. No. 7,193,536 issued on Mar. 20, 2007; and U.S. Pat. No. 7,283,066 and which are incorporated by reference herein. The keyboard constructions utilize a variety of electro luminescent, light transmitting panels and light emitting diodes (LED) for illuminating the keys of a keyboard. For the most part, these constructions are satisfactory.

It would be highly advantageous to provide a keyboard having illuminated key members which provided improvement in weight and simplicity; was inexpensive to manufacture; and required low power consumption.

SUMMARY OF THE INVENTION

Briefly, in accordance with the invention, I provide several embodiments of improved keyboard constructions having illuminated indicia and illuminated key members. The improved keyboard includes indicia, a plurality of key members, and in some embodiments, a light channeling membrane. The term "keyboard" is intended to be interpreted herein in a broad sense, unless specifically stated otherwise, to include any finger activated switch construction including computer keyboards, calculator and cellular telephone keypads, television remote controllers, and other handheld switching devices including depressable keys such as video games, GPS modules, etc.

In a first of many preferred embodiments, the upper clamshell member of the keyboard's housing acts as a light channeling membrane. The light channeling membrane and plurality of key members are manufactured of acrylic plastic, polycarbonate or glass for optical clarity, though other materials may be used depending on cost, weight and manufacturing limitations as would be understood by those skilled in the art. For this embodiment, the light channeling membrane includes a plurality of bores, with each bore being constructed for receipt of the key shaft of a corresponding key member. Meanwhile, each key member also includes a key cap having a symbol displayed thereon. Each key member shaft is constructed to extend downwardly and telescopically into a corresponding bore of the light channeling membrane to provide what is commonly referred to as a "plunger" type keyboard construction. Light is channeled through the translucent material of the light channeling membrane until it is emitted from cylindrical sidewalls into the membrane's bores. Light emitted from the bores' interior sidewalls is received onto the exterior of the shafts of the key members and channeled upwardly through the translucent material of the shaft, to the key caps which are also constructed of a translucent material. The key cap includes an upper surface having an alphanumeric symbol displayed thereon which is illuminated by light passing through the shaft of the key member to provide the desired illuminated alphanumeric symbol. The symbol can be constructed as light emitting or as opaque with the remainder of the top surface being conversely opaque or light emitting, depending on whether the desired symbol is in either a negative or a positive representation thereof.

In another preferred embodiment of the present invention, the keyboard housing is constructed partially of a substantially translucent material for communicating light rays through said keyboard in the form of indicia, wherein said indicia is discernible when light rays pass there through. The indicia may be an indicator or, for example, correspond to a key member or a group of key members.

The light source may take various forms known to those skilled in the art. For example, the light source may be an incandescent lightbulb, light emitting diode (LED), light emitting crystal (LEC), etc. . . . Moreover, the light source may produce light which can be selectively varied in color so as to enable the keyboard operator to alter the color of the luminescence of the key members. For example, the light source may comprise a plurality of diodes with each diode producing different colored light. Selective activation and deactivation of the diodes alone or in combination will produce key members illuminated in different colors.

In another preferred embodiment of the present invention, the light source is connected to a light pipe located within the keyboard housing for channeling light to a plurality of key members. The light pipe, also known as a light guide, may be constructed in various shapes and of various materials such as of lengths of acrylic plastic, polycarbonate, or glass. Alternatively, the light pipe may be constructed of one or more fiber optic fibers or cables. The light pipes may also be constructed of one or more different translucent and fluorescent colored materials for projecting light of one or more colors upon the key members, and for producing alphanumeric characters on the key members of different colors. An acceptable colored material includes "scintillating plastic" which is typically an acrylic plastic incorporating different colored fluorescent dyes.

Preferably, the light pipes are constructed to project light laterally from their exteriors. Where the light pipes are comprised of fiber optic cables, the fiber optic cables are also constructed to project light laterally from their cylindrical exterior as opposed to predominantly from their distal extremities. This can be accomplished by notching, knurling, scratching or in other manners creating flaws in the otherwise smooth exterior cylindrical surface of the fiber optic cable. These flaws have been found to interrupt the transmission of light along the length of the fiber optic cable and to transmit light laterally from the exterior surface of the fiber optic cable, typically opposite the side which has been flawed. For application with the present invention, a light pipe is routed alongside indicia or a plurality of key members. Light transmitted through the light pipe may be transmitted laterally upon the key shafts of the key members. The light is then channeled through the key members so as to be emitted from the upper surface of the key members to illuminate a symbol or character.

In an additional preferred embodiment of the present invention, the light source is constructed of a substantially planar plate underlying the light channeling membrane of the keyboard. An alternative construction for the illuminating sheet of the light source is described in U.S. Pat. No. 5,045,755 issued to Appelberg and assigned to E-Lite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which can be adhesively attached to the bottom of the keyboard light channeling membrane. Moreover, the illuminating sheet is sufficiently thin as to not require significant modification to existing computer keyboard designs.

An additional construction of the luminescent sheet can be obtained from MKS, Inc. located in Bridgeton, N.J., USA under the trademark designation Quantaflex™. The Quantaflex™ material is an electroluminescent lamp including luminescent phosphors embedded in the dielectric medium of a capacitor constructed in the form of a sheet. Electrodes, including at least one translucent electrode, form the top and bottom layers of the Quantaflex™ material. Upon application of an alternating current to the electrodes, the phosphors give off photons producing light in the visible spectrum. An advantage of the Quantaflex™ material is that the phosphors can be selectively encapsulated between the electrode layers of the luminescent sheet so as to selectively produce patterns of light emitted from the luminescent sheet. For example, for application with the present invention, it is preferred that the Quantaflex™ material be constructed to produce light only below and/or immediately adjacent to the key members so as to reduce power consumption.

In still additional embodiments, the luminescent sheet is constructed of one of the rapidly developing technologies directed to Organic Light Emitting Devices (OLED), Transparent Organic Light Emitting Devices (TOLED), or Flexible Organic Light Emitting Devices (FOLED). Descriptions of these technologies are available to those skilled in the art and will not be described in further detail herein.

In an additional preferred embodiment, the luminescent sheet is constructed as a light guide connected to a light source. The light guide is made of a substantially translucent material, such as an acrylic plastic, polycarbonate, epoxies and glass, connected to an independent light source, such as light emitting diodes, light emitting crystals, etc. For this embodiment, the light channeling luminescent sheet operates as a planar light pipe for channeling light from the light source to the key members.

In one embodiment, a light guide of the present invention includes a substantially planar translucent plate having a top, a bottom and one or more sides. For example, a circular light guide will have one side, a triangular light guide will have two sides, while a light guide for illuminating a keyboard would typically be rectangular and have four sides. Preferably, but not necessarily, the plate is continuous and has no holes, or very few holes, which can significantly deteriorate the plate's light carrying properties. Moreover, the translucent plate is preferably flat and of uniform thickness. However, as understood by those skilled in the art, the plate may be curved and vary in thickness depending on design requirements. The planar plate may be made from any number of materials such as glass or clear plastics including ABS, acrylics, polycarbonate, etc. . . . . In preferred embodiments, the planar plate includes sides which are curved or rounded so as to avoid any sharp edges at the transition of the top or bottom with the sides which can also deteriorate the plate's light carrying properties. Alternatively, the edge can include a recessed to form an external concavity which is preferably sized to receive any wiring, such as wiring for any light sources.

The light guide further includes one or more cavities formed into the bottom of the planar plate. The cavities may be formed by preforming the cavities into the planar plate in an injection molding process. Alternatively, the cavities can be machined into the planar plate using drilling or lathe equipment. In addition, the cavities may be any number of shapes including, but not limited to, pyramid, ellipsoid, parabolic, cone, hemispheric or cubic. Moreover, where the light guide includes a plurality of cavities, the cavities may be of different sizes and different shapes.

The light guide of the present invention also includes a reflector which underlies the translucent plate's bottom side and which covers the plurality of cavities. Preferably, the reflector also covers the translucent plate's sides and upper surface, except for where light is intended to be emitted, such as under the keys of a keyboard. The reflector may be made out of various materials such as Mylar, paper or other metals. However, it is important that the reflector include a highly reflective surface, and thus it is preferably mirrored, white, light grey, silver, metallic silver or metallic gold so that light striking the reflector will reflect off the reflector as opposed to be being absorbed or refracted. In addition, the reflector may incorporate glowing or phosphoric elements which will emit light upon experiencing light from another light source.

The reflector may be affixed adjacent to the translucent plate using various constructions known to those skilled in the art. However, in a preferred embodiment the reflector is attached to the translucent plate's underside using an adhesive which is either highly reflective or translucent. Alternatively, the reflector can be positioned and maintained in place using the overall construction of the keyboard housing which will maintain various components in place. Screws may be used to affix the reflector and translucent plate within a desired construction. However, it is preferred that the screws be reflective and of minimal size if inserted into holes formed through the reflector and translucent plate.

As a result of the reflector covering the cavities opening, the cavities are substantially sealed chambers within the planar's sheet. For manufacturing purposes, these chambers will typically be filled with air. However, various other translucent materials may be placed within the cavities, such as clear or colored plastics. Alternatively, the cavities can be filled with translucent phosphoric materials which will produce a glowing material or produce an alternative color upon light striking the material. Translucent plastics which produce a glowing or phosphoric appearance are sold under the generic name of "scintillating plastics". Where the translucent plate includes a plurality of cavities, the cavities may be filled or not filled, with a variety of materials such as plastics of different colors or phosphoric materials of different colors to produce light guide having points of illumination of different colors and luminosity.

The light guide of the present invention further includes a light source for emitting light which is received by the translucent plate. The light source may be any of numerous light sources known to those skilled in the art including electro-luminescent panels, incandescent light bulbs, light emitting diodes (LEDs) and light emitting crystals (LECs). However, for cost and efficiency, it is preferred that the light source of the present invention be one or more LEDs. The light sources may be positioned in any way so as to shine light onto or into the translucent plate. For example, the light source may be positioned immediately adjacent to the translucent plate's edges. Alternatively, the light sources may be positioned to project into a recess formed into the translucent plate's upper or lower surfaces or into the translucent plate's sides.

In operation, light is transmitted into the translucent plate. The light is then reflected off the reflector throughout the translucent plate's interior until striking the interface of the translucent plate with a cavity. Because of the translucent properties of both the cavity and the translucent plate, significant amounts of light will be transmitted from the translucent plate into the cavity by direct transmission or by refraction depending upon the light's angle to the cavity's interface and depending on material properties. Preferably the cavity has a cone, parabolic or ellipsoid shape causing light to project downwardly to strike the reflector. Upon striking the reflector, light is reflected upwardly through the cavity to translucent plate's interface where light passes again into the translucent plate until being transmitted from the translucent plate's upper surface.

As would be appreciated by those skilled in the art, various factors including the translucent plate's material and angle of light striking the sheet cavity interface will cause some light to reflect, as opposed to refract into the cavity. As a result of the cavities dome-light shape, much of the light will be caused to reflect upwardly through the plate to be transmitted from the translucent plate's upper side. As a result of the light reflected and refracted from the plate and cavity interfaces, the light guide will produce one or more illuminated shapes formed on the translucent plate's upper side which correspond in size and placement to the underlying cavities.

Typically, the light producing cavities will be centered directly under the keys of a keyboard. However, in an alternative preferred embodiment, the cavities are displace off-center from directly below a key member. In particular, it has been found that backwardly displacing the light produced under a key approximately 1-5 mm. can make the characters, also referred to herein as indicia, formed on a key to appear more luminous. The amount of offset can be determined by one skilled in the art due to the viewing angle of a person operating the keyboard and due to the placement of characters on the key members.

In still an additional embodiment of the luminescent planar sheet which is ideal where the luminescent sheet needs to be particularly thin such as is required for laptop keyboards, the light guide does not include an cavities. Instead, the light guide has a flat underside surface but includes reflective members positioned underneath each of the keys. Each reflective member is reflective causing light, such as provided by LEDs positioned along the sides of the light guide, to reflect upward toward each overlying key.

In preferred embodiments, the reflective members are comprised of reflective paint painted onto the bottom of the light guide, or are comprised of thin reflective paper or plastic or the like, affixed under the keys. Preferably, an additional reflective sheet covers the underside of the light guide as well as the reflective members. Also preferably, the reflective members provide greater light diffusion than the reflector. For example, it has been has discovered that "flat" white reflector members provide better illumination to the keys than glossy white reflector members having lesser light diffusion.

Thus, a preferred light pipe includes a plainer sheet of plastic material without any underlying deformities forming the light guide. Instead of cavities, the underside is covered by a first layer of reflective members positioned under each key such as in the form of reflective white circles or squares ¼-¾ inch across, with a preferred width of approximately ½ inch. The white reflective members are preferably "flat white" in appearance to provide light diffusion. The reflective members are then covered by a sheet of glossy paper or the like which is mirrored, white, light grey, silver, metallic silver or metallic gold in appearance have lesser diffusion than the overlying reflective members.

The light guides of the present invention may be incorporated into the various keyboard constructions having illuminated indicia and illuminated key members. A few such keyboards are described as follows. A preferred keyboard includes a plurality of key members, and a light channeling membrane. The key members and light channeling membrane are constructed of a substantially translucent material capable of channeling light rays. In addition, the keyboard of the present invention includes a light source optically connected to the light channeling membrane. In operation, the light source produces light rays which are received by the light channeling membrane within the keyboard housing, or is positioned adjacent the indicia or plurality of key members. The light rays are channeled through the light channeling membrane to the indicia or key members which receive the light rays at their lower extremities and which channel the light rays upwardly to their top surface. Light is then emitted from the top of the key member to either provide illumination around an opaque construction of a symbol displayed on the top surface of the key member, or in the alternative, to emit light rays in the shape of the symbol itself, as in the case of keyboard indicia.

In still an additional preferred embodiment, the luminescent sheet is constructed of a plurality of fiber optic cables laid side by side to form a planar sheet. The ends of the cables are positioned adjacent to one or more LEDs or LECs so that emitted light is channeled through the fiber optic cables. Again, the fiber optic cables are notched, knurled, scratched or the smooth exterior is otherwise flawed to interrupt the transmission of light along the length of the fiber optic cables and to transmit light laterally from the exterior surface of the fiber optic.

Where the keyboard of the present invention utilizes an illuminating sheet for providing light to the key members, the illuminating sheet may be formed with a plurality of holes. The luminescent sheet is then affixed below the light channeling membrane with the holes of the luminescent sheet underlining the bores projecting through the upper clamshell member of the keyboard, which may also function as a light channeling membrane. This construction permits the shafts of the key members to project through the clamshell bores and through the holes of the illuminating sheet. Where the keyboard is constructed for use with a computer, disposed below the illuminating sheet is an elastomeric diaphragm, for biasing the key members upwardly, and a keyboard circuit board. The circuit board includes a plurality of switches which are closeable upon pressure application such that depression of the key members causes the respective key shafts to project downwardly through the membrane bores and illuminating sheet holes to depress the elastomeric diaphragm to, in turn, activate the circuit board switches. The closure of a particular circuit board switch results in a corresponding signal being sent to the computer indicating that a particular key member has been depressed.

In an additional embodiment of the present invention, the planar luminescent sheet is disposed between the elastomeric diaphragm and circuit board. The elastomeric diaphragm is manufactured of a translucent material so that light emitted upwardly from the luminescent sheet shines upon the bottoms of the key member shafts, and preferably upon the bottom of the upper clamshell member of the keyboard which is also preferably manufactured of a translucent material. For this embodiment, the elastomeric diaphragm and upper clamshell member cooperate to function as a light channeling membrane to transmit light from the light source to the key members. The light is then channeled through the key members to be transmitted from the tops of their key caps.

In still an additional embodiment of the present invention, the keyboard is constructed with the planar luminescent sheet positioned to underlie the elastomeric diaphragm and circuit board of the keyboard. The elastomeric diaphragm and circuit board are manufactured of substantially translucent materials for permitting light emitted from the luminescent sheet to project upwardly through the circuit board and elastic diaphragm to strike the bottom extremities of the key members. It is preferred that the upper clamshell member of the keyboard also be translucent for channeling light rays to the sidewalls of the key member shafts. However, for this embodiment, the elastic diaphragm and circuit board of the keyboard also function as the light channeling membrane. Light emitted from the planar sheet is channeled through the translucent material of the elastomeric diaphragm and circuit board to the key members. The light is then transmitted through the key members to the key member's upper surface where it is emitted from the top of the key cap in the shape of a character displayed on the key cap.

In a preferred embodiment of the keyboard wherein the planar luminescent sheet is positioned to underlie the elastic diaphragm and circuit board of the keyboard, the keyboard is ideally constructed for use as a laptop keyboard or keyboard desiring short key stroke travel. For this embodiment, the keyboard includes scissor actuators for stabilizing each key to provide upward and downward movement and which are of the type commonly found within laptop computers and which are well understood by those skilled in the art. Each scissor actuator includes a pair of scissor arms which are rotationally connected at or near their midpoints to permit the arms to rotate in a scissor-like manner. Like other constructions described herein, a substantially translucent elastomeric diaphragm including elastomeric domes underlies the key members for biasing the keys upwardly. A seat underlies the elastomeric domes for supporting and engaging the bottom extremities of the scissor actuators. To this end, the seat includes clips which project through holes formed in the elastomeric diaphragm to engage and connect to the bottom extremities of the scissor actuators. As would be understood by those skilled in the art, the seat clips will project above the top of the elastomeric diaphragm and the elastomeric domes may project down below the bottom of the seat when a key is depressed. However, the elastomeric diaphragm and accompanying domes are predominantly above the seat, and are described accordingly herein. The seat may be made of translucent plastic, which functions as a translucent upper clamshell member, or the seat may be made of non-translucent metal having sufficiently large holes for the passage of light.

A substantially translucent circuit board is positioned under the seat for the creation and transmission of signals upon depression of key members. The seat includes holes below each key allowing for the depression of keys to force the elastomeric domes through the seat to engage the circuit board to create electronic signals.

A planar luminescent light source is positioned under the circuit board for transmitting light upwardly through the circuit board, seat, and elastomeric domes into the key members. The planar light source may include LED or LEC systems in adjoining relationship to the light channeling membrane or light pipe. In a preferred embodiment, the luminescent planar luminescent sheet underlies the keys, elastomeric diaphragm, seat and circuit board.

In a preferred embodiment, where the upper clamshell member is translucent, it is preferred that the keyboard be constructed or coated with an opaque material in the interstitial regions between the key members so that light does not project upwardly between the key members which would cause visual glare to the keyboard operator or which would otherwise detract from the relative luminescence of the symbols displayed on each of the key members.

Preferably, substantial portions of the keyboard and key members are coated on their exterior surfaces with a reflective opaque coating such as paint or the like where light is not intended to be emitted from their exteriors. More particularly, it is preferred that the key members and upper clamshell member are coated with a reflective paint for reflecting visible light, which would ordinarily be emitted from the key members and upper clamshell member or substantially absorbed by a substantially non-reflective material. Thus, traditional non-reflective paints and coatings such as dark grey, black or blue are preferably avoided. Meanwhile, diffuse reflective coatings such as light grey, white, and silver are preferred, as are coherent reflective coatings such as metallic silver, metallic gold and other shiny metallic colors. Alternative substantially reflective coatings can be selected by those skilled in the art without undue experimentation. In practice, much of the visible light, which would ordinarily be lost, is reflected in either a diffuse or coherent manner back into the upper clamshell member or key members until projected from the tops of the key caps to provide enhanced luminosity of the characters formed on the key caps.

In still an additional preferred embodiment, the key caps and clamshell member include two coatings of paint or the like. The initial first coating utilizes a highly reflective coating, such as appearing light grey, white, silver, and metallic coatings such as silver, gold and other shiny metallic colors, to reduce light absorption and reflect the visible light back into the translucent material until transmitted from the key caps. Meanwhile, a second coating of an alternative paint or other material is applied over the first coating. The second coating may also be reflective. However, it is preferred that the second coating is less reflective of visible light than the first coating, and preferably is a substantially non-reflective dark dull color such as dark grey, black or blue.

Accordingly, it is an object of the present invention to provide an improved light distribution construction, such as a light guide, which is less expensive than previous designs.

It is an object of the present invention to provide a light guide that can be incorporated into a wide variety of products including, but not limited to, dashboards, automatic teller machines (ATMs), airplane and spacecraft cockpit, calculator and cellular telephone keypads, television remote controllers, video games and GPS modules, etc.

It is also an object of the invention to provide a light guide for a keyboard having illuminated key members suitable for use with today's computer systems including portable computers.

It is thus an object of the present invention to provide an inexpensive and simple way to construct a keyboard having illuminating indicia or keys.

It is also an object of the present invention to provide a keyboard having illuminated indicia or key members suitable for use with today's computer systems including portable computers.

Moreover, it is an object of the present invention to provide a keyboard having illuminated indicia or key members which does not require routing of fiber optic cables to each key member.

These and other and more specific objects and advantages of the invention will be apparent to those skilled in the art from the following detailed description taken in conjunction with the drawings.

BRIEF DESCRIPTION OF THE DRAWINGS

FIG. 18 is a bottom perspective view of a light guide of the present invention which can be incorporated into a wide variety of illuminated structures;

FIG. 19 is a top perspective view of a light guide of the present invention which can be incorporated into a wide variety of illuminated structures;

FIG. 23 is a side cut-away view illustrating a keyboard and light guide of the present invention including a reflector which covers the top, bottom and sides of the translucent plate;

FIG. 24 is a side cut-away view illustrating a membrane switch keyboard and light guide of the present invention including a reflector which covers the bottom and sides of the translucent plate;

FIG. 25 is an exploded bottom perspective view of a preferred plan luminescent sheet incorporating diffusive dots;

FIG. 26 is an exploded top perspective view of a preferred plan luminescent sheet incorporating diffusive dots illustrated in FIG. 25;

FIG. 27 is a top plan view of a preferred light pipe for use with a planar luminescent sheet;

FIG. 28 is an exploded side view of a preferred luminescent sheet incorporating diffusive dots illustrated in FIG. 25;

FIG. 29 is a side view of a preferred luminescent sheet incorporating diffusive dots illustrated in FIG. 25;

DETAILED DESCRIPTION OF PREFERRED EMBODIMENTS

Figure 1:
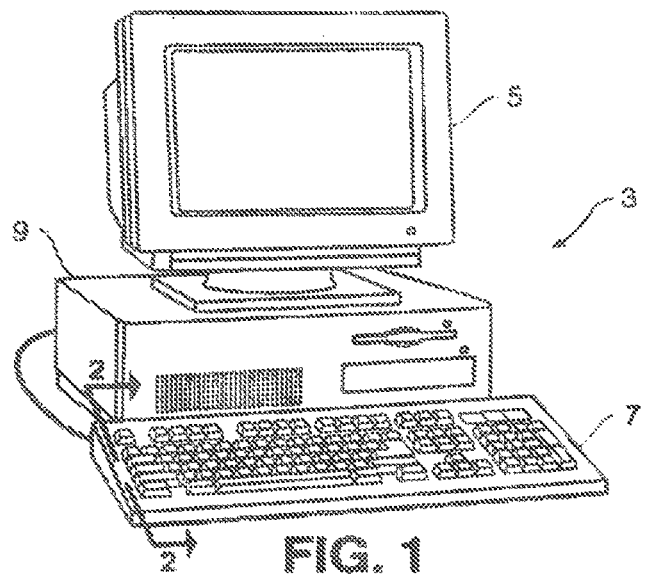
FIG. 1 is a perspective view of a computer including the keyboard of the prior art.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to specific embodiments illustrated.

Figure 2:
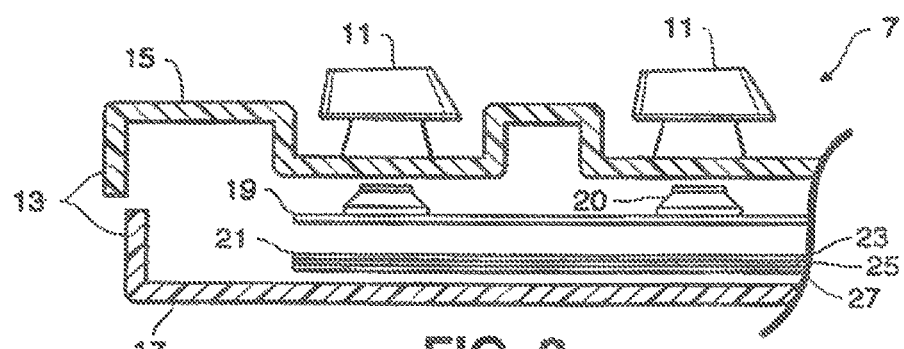
FIG. 2 is a cutaway view of the keyboard shown in FIG. 1.
Figure 3:
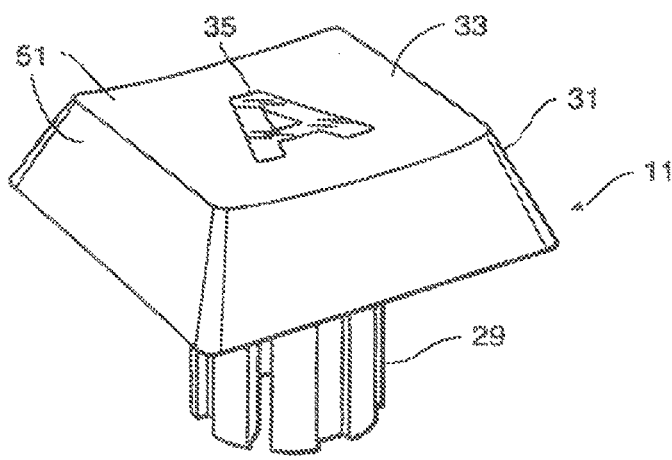
FIG. 3 is a perspective view of a preferred embodiment of a key member for use with the keyboard having illuminated keys of the present invention.

Referring to FIGS. 1-3, keyboards are required to operate numerous apparatus including computers, typewriters and personal organizers, as well as aircraft and vehicular instrument panels. A typical prior art keyboard 7 is shown in FIG. 1 for use with a computer 3. The computer 3 also includes a central processing unit 9 and monitor 5. By pressing key members 11 on the keyboard 7, one sends signals to the central processing unit 9 instructing the computer 3 to perform various functions.

As shown in FIG. 2, a typical keyboard 7 includes a housing 13 comprising an upper clamshell member 15 and lower clamshell member 17. The keyboard 7 further includes a plurality of key members 11 and a diaphragm 19 having elastomeric diaphragm projections 20 for biasing the key members 11 to a normally upward position. A typical computer keyboard 7 further includes a circuit board 21 which is disposed below the key members 11 and diaphragm 19. The circuit board 21 includes first and second printed wiring layers 23 and 27 which include engraved or embedded electrical circuits. The printed wiring layers 23 and 27 are separated by an insulator or dielectric layer 25. The insulator layer 25 includes a plurality of holes so that depression downwardly of the key members 11 causes the diaphragm projection 20 to be forced downwardly upon the upper printed wiring layer 23 so that the printed wiring layers 23 and 27 can come in contact to open and close distinctive electrical switches through the holes of the insulator layer 25. Each of these electrical switches correspond to different key members 11 so that the keyboard operator can depress the key members either individually or in combination to send various signals to the computer's central processing unit 9.

With reference to FIGS. 3-7, a keyboard 1 is provided having illuminated key members 11. Each key member 11 includes a key shaft 29 and a key cap 31. Displayed on the top surface 33 of the key cap 31 is a symbol 35 such as an alphanumeric character. For application of the keyboard 1 of the present invention, the key member 11 is constructed at least partially of a substantially translucent light channeling material so that light can be received by the outer surfaces of the key shaft 29 and channeled upwardly to be emitted from the key cap's upper surface 33. In a first embodiment, light rays are emitted from the symbol 35 itself in which the translucent material portion of the key cap 31 extends through the key shaft 29 and key cap 31 to the key symbol 35. The remaining portion of the key cap's upper surface 33 is constructed of a non-light emitting material or covered by an opaque coating 51 (FIG. 3). In the alternative, the entire key cap 31 including upper surface 33 is constructed of a translucent light emitting material while the symbol 35 is formed of a non-light emitting material, depending whether the symbol 35 is intended to be displayed as a negative or positive representation.

Figure 4:
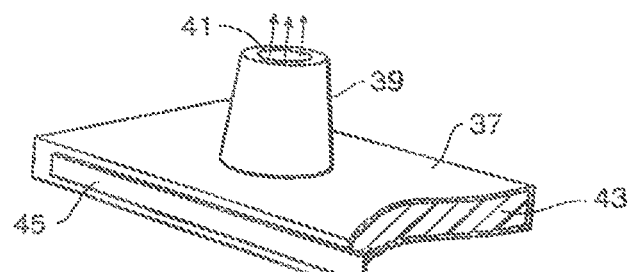
FIG. 4 is a perspective cutaway view of the translucent light channeling membrane for use with the keyboard having illuminated keys of the present invention illustrating a light source as an LED or LEC component.
Figure 5:
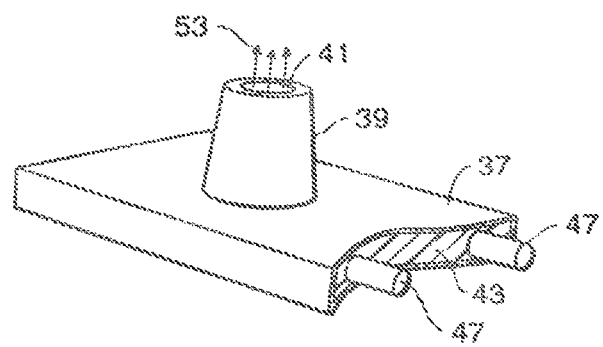
FIG. 5 is a perspective cutaway view of the translucent light channeling membrane for use with the keyboard having illuminated keys of the present invention illustrating a light source as one or more fiber optic cables embedded in the translucent light channeling membrane.
Figure 6:
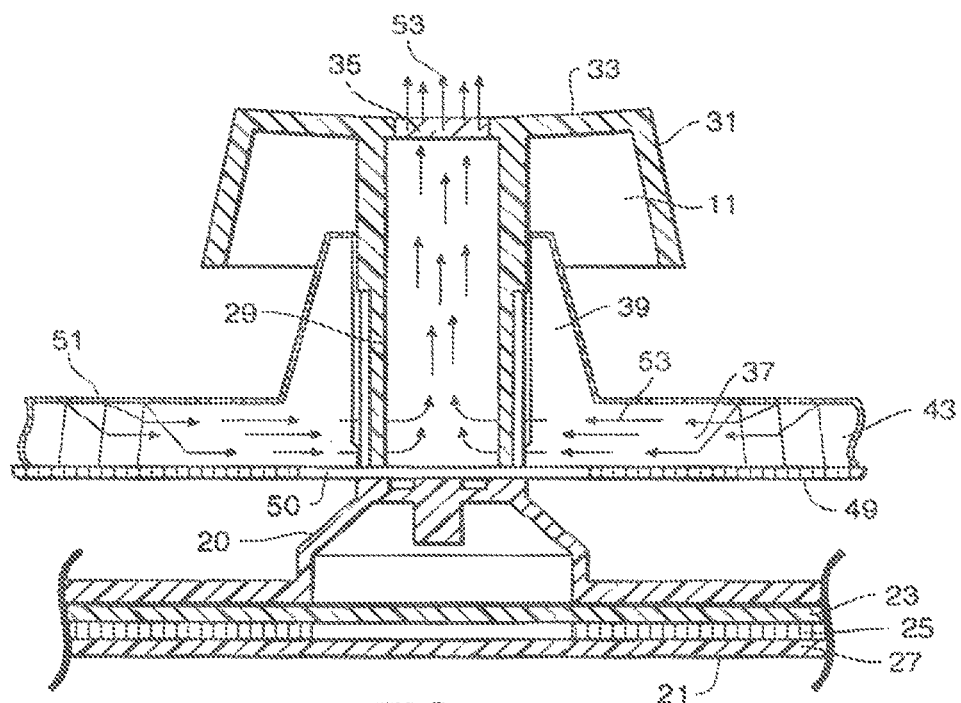
FIG. 6 is a cutaway view of a preferred keyboard having illuminated keys of the present invention wherein the light source is a planar illuminating sheet underlying the light channeling membrane of the keyboard.
Figure 7:
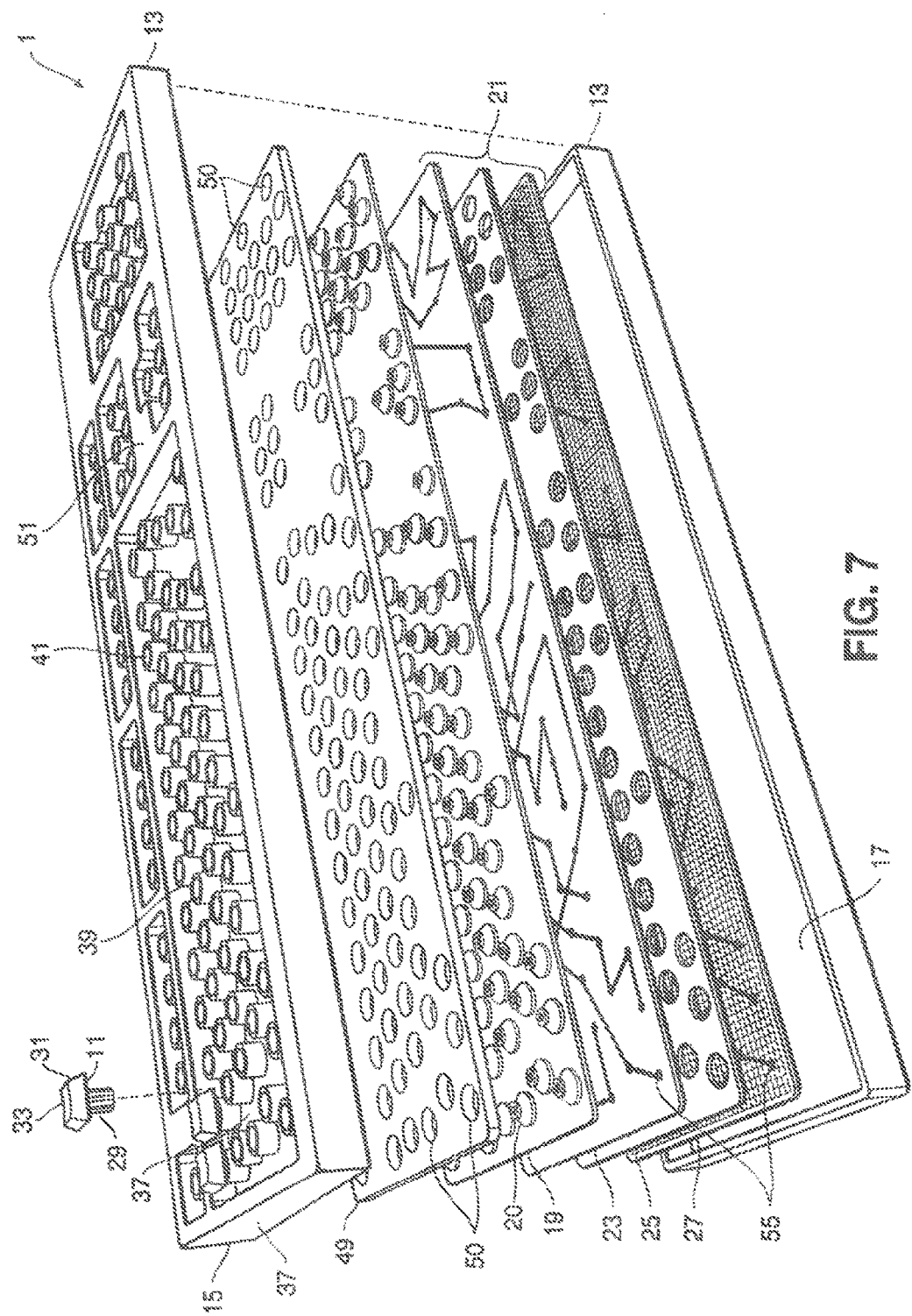
FIG. 7 is an exploded view of the keyboard having illuminated keys of the present invention in which the light source is a planar illuminating sheet underlying the light channeling membrane of the keyboard.

With reference to FIGS. 4-7, preferably though not necessarily, the keyboard 1 of the present invention includes a light channeling membrane 37. The light channeling membrane 37 underlies the key members 11 and is constructed to channel light rays 53 from a light source to the key shafts 29 of the key members 11, which in turn channel the light rays 53 along the length of the key shafts 29 to the key cap's upper surfaces 33. As shown in FIGS. 6 and 7, the light channeling membrane 37 is incorporated into the upper clamshell portion 15 of the keyboard's housing 13. This is accomplished by constructing the upper clamshell member 15 at least partially of a translucent light channeling material. Light rays 53 received upon the light channeling membrane's 37 outer surfaces are channeled throughout the translucent material to the key members 11. Preferably, the upper surface of the light channeling membrane 37 is coated or otherwise constructed with an opaque coating 51 so that only the upper surfaces 33 of the key members 11 are seen to illuminate by the keyboard operator. As shown in FIGS. 6 and 7, in a preferred embodiment, the light channeling membrane 37 includes a plurality of hollow projections 39 having central longitudinal bores 41 configured for receipt of the key shafts 29 of the key members 11. The hollow projections 39 may project upwardly as shown in FIGS. 4-10, or may project downwardly as shown in FIGS. 11-13, and 15. Preferably, the keyboard 1 also includes a diaphragm 19 having a plurality of elastomeric projections 20 for biasing the key members 11 upwardly.

In addition to the specially constructed key members 11 and light channeling membrane 37, the keyboard 1 of the present invention includes a light source. For this embodiment, the light source may be embedded in, positioned alongside, or positioned underneath the light channeling membrane to communicate light to the light channeling membrane 37. As shown in FIG. 4, in a first embodiment, the light source is comprised of one or more light strips 45 which can be either light emitting diodes (LED) or light emitting crystals (LEC) systems or other constructions known to those skilled in the art which emit light into (as shown in FIG. 5), or upon the exterior side or bottom surfaces of the light channeling membrane 37. With reference to FIGS. 5 and 11-13, in a second embodiment, the light source is connected to one or more light pipes 47, such as fiber optic cables, which are constructed to project light laterally along their length. In particular, it has been found that fiber optic cables 47 provide a highly luminescent surface where the curved cylindrical surface has been notched, knurled, scratched or otherwise flawed so that the flaws receive light rays from the interior of the fiber optic cables 47 and emit those light rays laterally from the fiber optic cables exterior surface. For application with the present invention, the light pipes 47 are routed alongside, below or embedded in the upper clamshell member 15, which is preferably at least partially translucent so that light rays 53 channeled from the outer surface of the light pipe 47 is received by the translucent material and channeled within the translucent region 43 to the key members 11.

Figure 11:
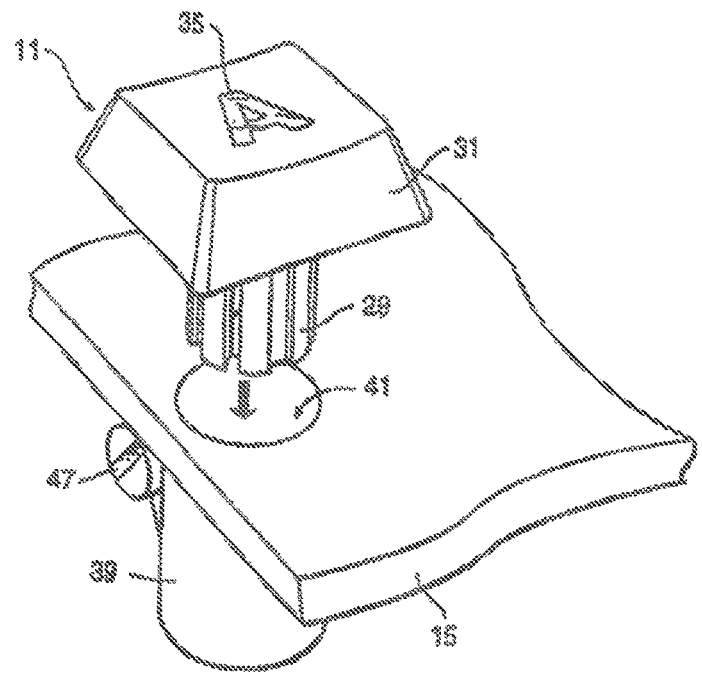
FIG. 11 is a perspective exploded view of a preferred keyboard in which a cylindrical light pipe is positioned adjacent to the clamshell sidewall for transmitting light upon the side of the key shaft of a key member.
Figure 12:
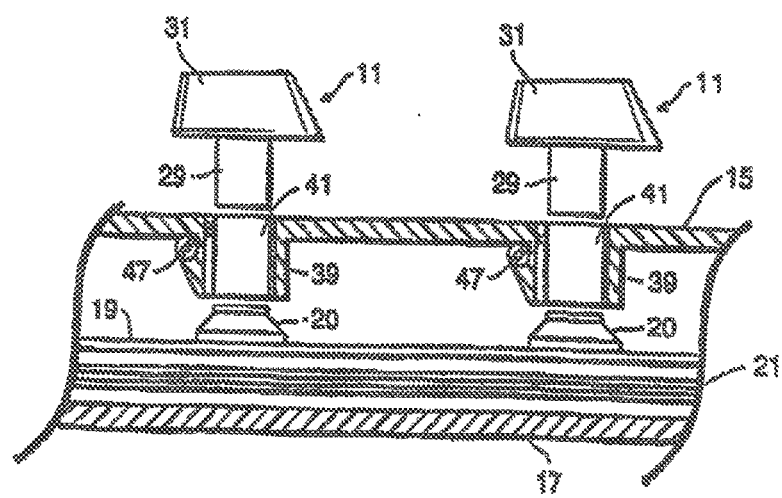
FIG. 12 is a side cut-away exploded view of the keyboard shown in FIG. 11 in which light pipes are positioned adjacent to two rows of downwardly projecting clamshell sidewalls for transmitting light upon the sides of a plurality of key shafts for illuminating a plurality of key members.
Figure 13:
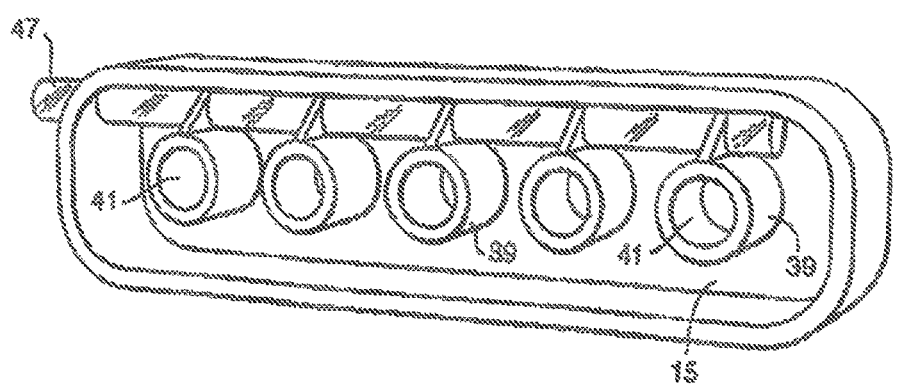
FIG. 13 is a top perspective view of a top clamshell member in which a light pipe is embedded therein for transmitting light adjacently upon the sides of a plurality of keys for illuminating a plurality of key members.

For example, as shown in FIGS. 11-13, a light pipe 47 is positioned adjacent to a plurality of key members 11, so that a single light pipe can be used to illuminate a plurality of key members. Again, the light pipe 47 may be constructed of various materials in various shapes as can be determined by those skilled in the art. As shown in the figures, the light pipe 47 is attached to, or formed integral with, the upper clamshell member 15, adjacent the hollow projections 39. Preferably, the hollow projections 39 are constructed to include a portion that is at least partially translucent to allow light channeled by the light pipe 47 to channel into the bores 41 formed by the hollow projections 39 and onto the key shafts 29 of the key members 11. Alternatively, the hollow projections 39 have openings (not shown) in their sidewalls to allow light to project laterally from the light pipe 47 through the openings and onto the exterior of the key shafts 29 of the key members 11. The light channeled by the light pipe 47 strikes the sides of the key shafts 29 and is transmitted through the translucent material of the key member 11 to be projected from the top of the key cap 31 in the form of an alphanumeric character 35. Where the keyboard is constructed with an elastic diaphragm 19 having elastic projections 20 which project into the bores 41 formed by the hollow projections, preferably, the elastomeric projections 20 are also constructed of a translucent material so that the elastomeric projections do not impede the transmission of light from the light pipe 47 to the key members 11 prior to depression of the key members.

In another preferred embodiment of the invention, the light source is constructed as a substantially planar sheet 49 affixed below the bottom surface of the light channeling membrane 37. As shown in FIGS. 6 and 7, in one of the preferred embodiments, the planar sheet 49 is constructed with a plurality of holes 50 which underlie the conical projections 39 and longitudinally extending bores 41 of the light channeling membrane 37. A shown in FIG. 7, this construction permits the key shafts 29 of the key members 11 to telescope downwardly into the bores 41 and through the holes 50 of the luminescent sheet 49. Though the key members 11 are normally biased upwardly by the elastomeric projections 20 of the diaphragm 19, downward depression of the key members 11 by fingertip pressure on the key member's upper surfaces 33 causes the key shafts 29 to project downwardly through bores 41 and holes 50 until the bottom extremity of the key member 11 forces the diaphragm projections 20 to forcibly close electrical switches 55 in the circuit board 21.

Figure 8:
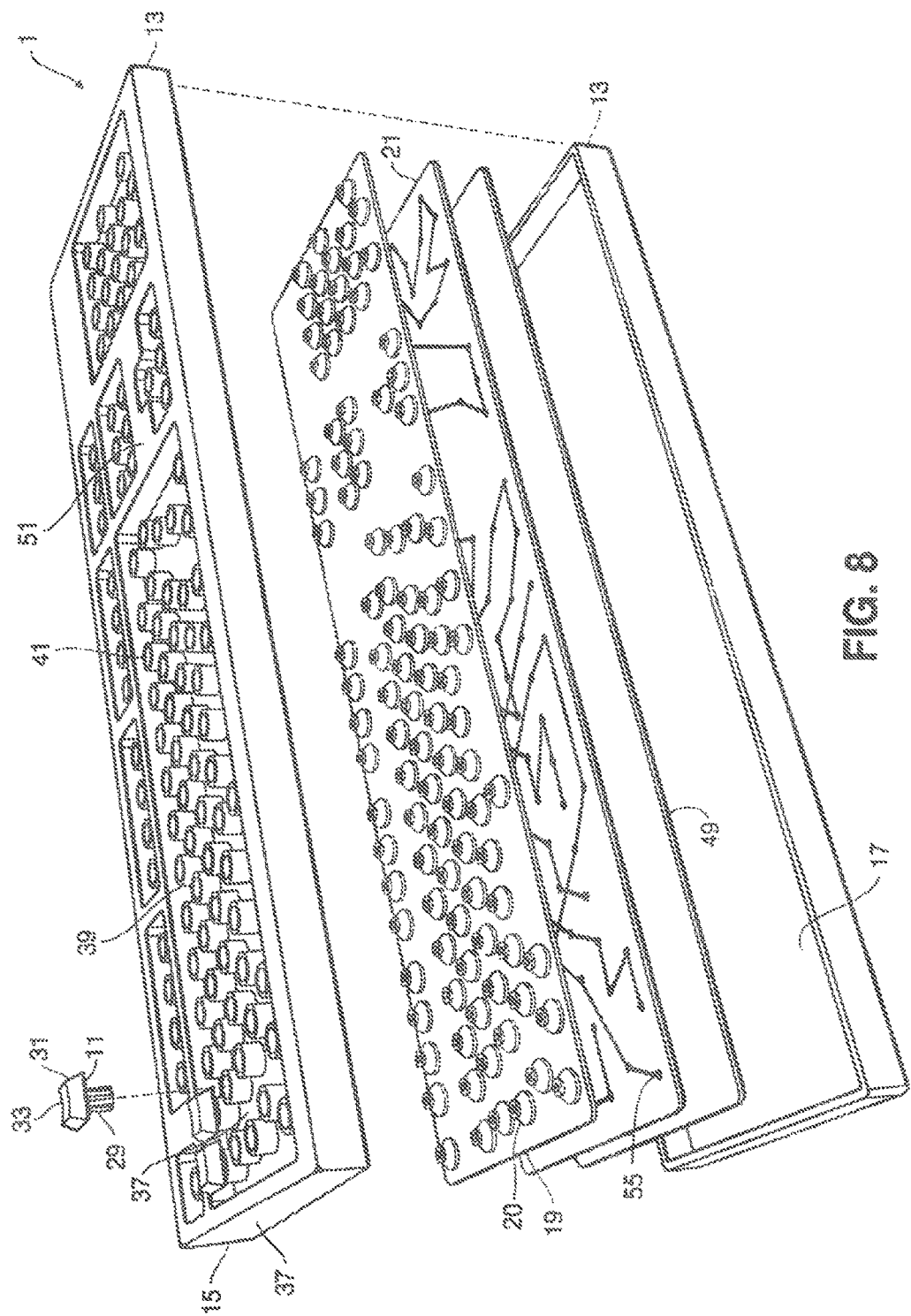
FIG. 8 is a cutaway view of a preferred keyboard having illuminated keys of the present invention wherein the light source is a planar illuminating sheet underlying the diaphragm and circuit board of the keyboard.
Figure 9:
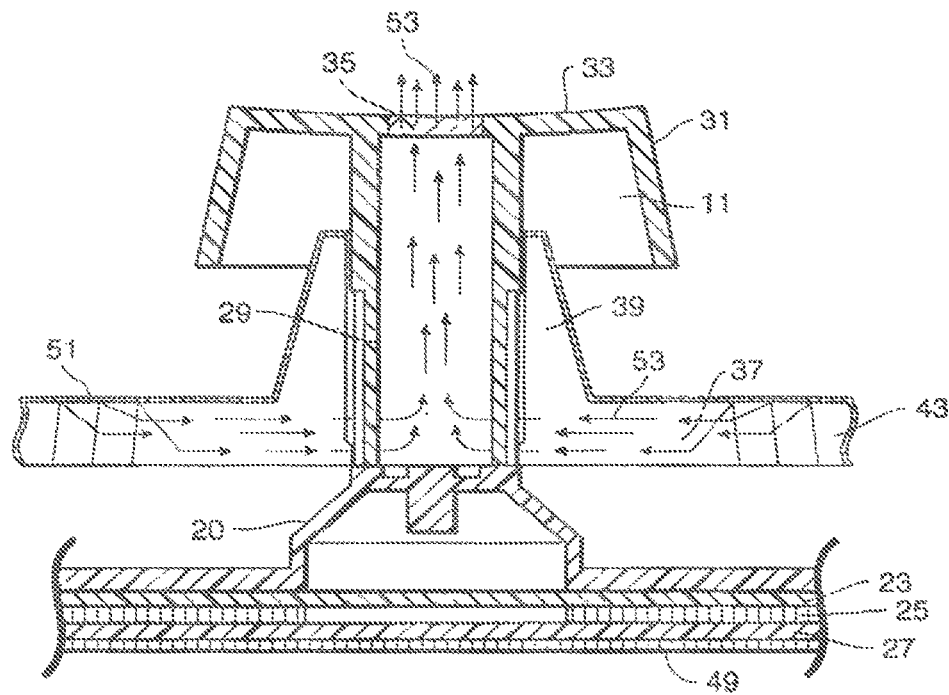
FIG. 9 is an exploded view of the keyboard having illuminated keys of the present invention in which the light source is a planar illuminating sheet underlying the diaphragm and the circuit board of the keyboard.

With reference to FIGS. 8 and 9, in an additional preferred embodiment, the planar luminescent sheet 49 underlies both the diaphragm 19 and the circuit board 21. The diaphragm and circuit board are constructed to be substantially translucent, and light emitted upwardly by the luminescent planar sheet 49 is transmitted through the translucent diaphragm and circuit board to the bottom of the key members 11. Because the key members are also manufactured of a translucent material, the light is then channeled through the key members' shafts 29 to be emitted from the key's upper surface 33 in the form of a symbol 35.

With reference also to FIGS. 6 and 7, this embodiment has the benefit of not requiring that the upper clamshell member 15 of the keyboard be manufactured of a translucent material so as to function as a light channeling membrane 37. Instead, the translucent circuit board 21 and diaphragm 19 operate as a light channeling membrane by communicating light emitted by the planar sheet 49 to the bottom extremities of the key members 11. Light is then emitted from the upper surfaces 33 of the key members. Also with reference to FIGS. 6 and 7, this embodiment also has the benefit of not requiring that the luminescent planar sheet 49 be formed with holes 50 underlying each of the key members for permitting the shafts 29 of the key members to project downwardly through the holes so as to engage the diaphragm 19 and circuit board 21. Instead, the keyboard is constructed with the luminescent planar sheet positioned so as to avoid contact with the moving members of the keyboard, the key members and diaphragm. For this embodiment of the present invention, it is preferred that the luminescent planar sheet not include any holes so that the luminescent planar sheet can provide a maximum of luminosity to the key members.

Figure 30:
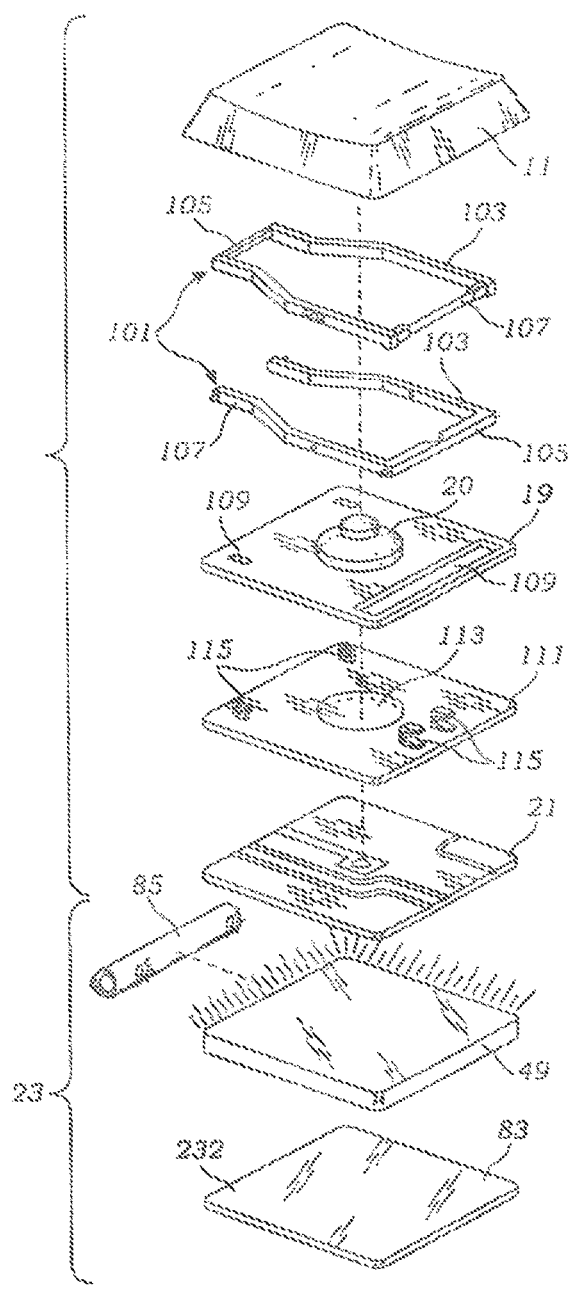
FIG. 30 is a top exploded perspective view of a preferred keyboard of the present invention incorporating scissor actuators.
Figure 31:
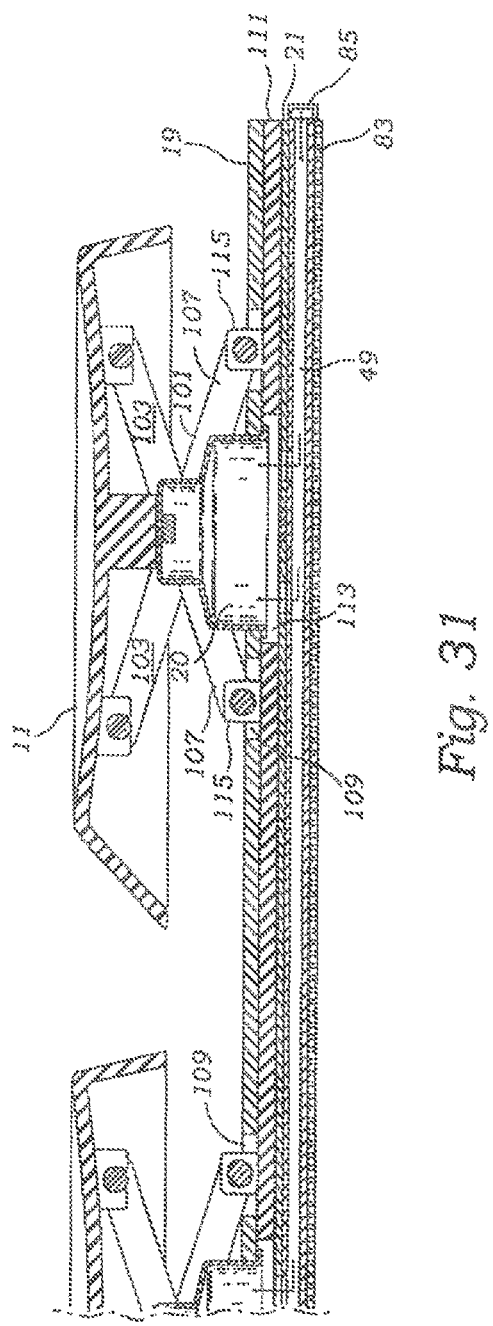
FIG. 31 is a side view of a preferred keyboard of the present invention incorporating scissor actuators.

With reference to FIGS. 30 and 31, in still another preferred embodiment of the keyboard wherein the planar luminescent sheet is positioned to underlie the elastomeric diaphragm and circuit board of the keyboard, the keyboard includes scissor actuators 101 for stabilizing each keysll upward and downward movement. Scissor actuator constructions are well understood by those skilled in the art and only a simplified construction is illustrated within FIGS. 30 and 31. Alternative constructions can be devised by those skilled in the art without undue experimentation.

As illustrated in FIGS. 30 and 31, each scissor actuator 101 includes a pair of scissor arms 103 which are rotationally connected at or near their midpoints to permit the arms 103 to rotate in a scissor-like manner to allow a key to move upward or downward. Like other keyboard constructions described above, the keyboard includes a substantially translucent elastomeric diaphragm 19 including elastomeric domes 20 underling each of the key members for biasing the keys 11 upwardly. A seat 111 underlies the elastomeric domes 20 for supporting and engaging the bottom extremities 107 of the scissor actuators. The seat 111 engages and connects to the scissor actuators 101 with integrally formed clips 115 which project through holes 109 formed in the elastomeric diaphragm to connect to the scissor arms lower extremities 107. As understood by those skilled in the art, the clips 115 allow the scissor arms to rotate and slide (not shown) so as to permit scissor action of the scissor actuator arms 103 and the upward and downward movement of the keys 11. The seat 111 may be made of translucent plastic, which functions as a translucent upper clamshell member, or the seat may be made of non-translucent metal having sufficiently large holes for the passage of light. Preferably, the seat, including clips, is made of one piece of stamped metal, or one piece of molded translucent plastic such as acrylic, polycarbonate, or the like.

As best illustrated in FIG. 31, and as would be understood by those skilled in the art, the seat clips 115 projects above the top of the elastomeric diaphragm 19 and the elastomeric domes 20 may project down below the bottom of the seat when a key is depressed. However, the elastomeric diaphragm 19 and accompanying domes 29 are predominantly above the seat 111, and accordingly, the elastomeric diaphragm 19 and domes 20 are described herein as above the seat 111.

This embodiment of an illuminated keyboard illustrated in FIGS. 30 and 31 includes a substantially translucent circuit board 21 positioned under the seat for the creation and transmission of signals indicating depression of keys 11. To this end, the seat 111 includes holes 113 below each key 11 allowing for the depression of keys to force the elastomeric domes 20 to engage the circuit board 21 to create electronic signals. A planar luminescent sheet 49 is positioned under the circuit board for transmitting light upwardly through the circuit board 21, seat 111, and elastomeric domes 20 into the keys 11. The planar luminescent light source 49 may take any of numerous forms including, but not limited to, the constructions described herein. However, a preferred luminescent planar sheet 49 includes a light pipe connected to an independent light source such as LEDs 85. In operation, the luminescent planar luminescent sheet 49 transmits light upwardly, in order from bottom to top, through the circuit board 21, seat 111, and elastomeric domes 20 to the keys 11.

Figure 10:
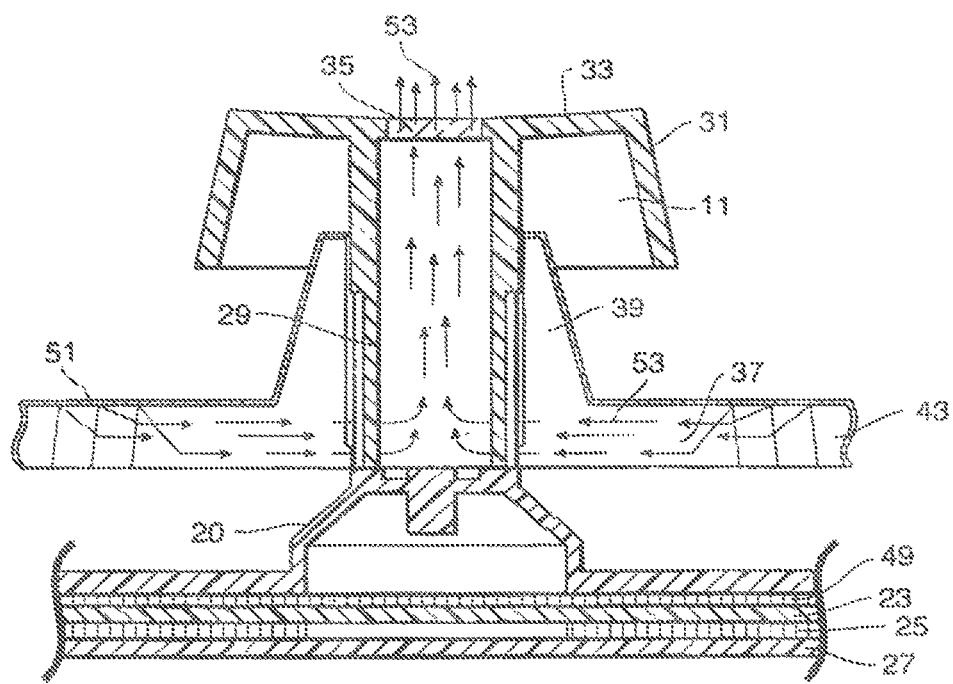
FIG. 10 is an exploded view of the keyboard having illuminated keys of the present invention in which the light source is a planar illuminating sheet positioned between the elastomeric diaphragm and circuit board of the keyboard.

With reference also to FIG. 10, in an additional embodiment of the present invention, the light source 47 is positioned between the diaphragm 19 and circuit board 21. The light source is again constructed in planar form having at least its top side providing luminescence. The elastic diaphragm 19 is manufactured of a translucent elastomeric material so that light emitted upwardly from the light source, in the form of a luminescent sheet 49, shines through the diaphragm projections 20 and upon the bottoms of the key member shafts 11. Preferably, for this embodiment, the upper clamshell member 15 of the keyboard is also preferably manufactured of a translucent material so that light emitted from the luminescent sheet strikes the underside of the upper clamshell member 15 and is channeled to the sidewalls of the key members. For this embodiment, the elastomeric diaphragm and upper clamshell member cooperate to function as a light channeling membrane, transmitting light from the light source to the key members 11. The light is then channeled through the key members to be transmitted from the tops 33 of the key caps 31.

This embodiment has the advantage over the previous embodiment in that light emitted from the light source is not transmitted through the circuit board 21 prior to striking the outer surfaces of the key members 11 which could cause diminished luminescence from the key members due to light reflection, refraction or absorption caused by the optical properties of the circuit board. However, this embodiment has the disadvantage over the prior described embodiment in that the light source is positioned between the key members and the circuit board. This construction requires that the light source be compressed with each actuation of the keyboard key members unless the light source is constructed with holes to permit the key members to engage the circuit board directly which would also diminish the amount of light emitted from the key members. Though troublesome, this disadvantage can be overcome using the above described material from MKS, Inc. which it is believed can withstand the cyclic compression stemming from the actuations of the key members.

Luminescent planar sheets can be constructed by those skilled in the art using various technologies. For example, the luminescent planar sheets may be constructed of an electro luminescent lamp, an Organic Light Emitting Device (OLED), a Transparent Organic Light Emitting Device (TOLED), or a Flexible Organic Light Emitting Device (FOLED). Alternatively, the luminescent sheet may be constructed of a substantially translucent material which acts as a "light pipe" connected to an independent light source such a fiber optic light source, light emitting diodes, or light emitting crystals. In still an additional embodiment, the luminescent sheet is constructed of a plurality of fiber optic strands laid side-by-side to form a sheet which connects to an independent light source such as light emitting diodes or light emitting crystals. The translucent material channels the light from the light source to the keys, or to a separate light channeling membrane 37 to illuminate the keys.

With reference to FIGS. 18-24, a preferred light guide 49, also referred to herein as a luminescent planar sheet, includes a translucent plate 71 constructed in any number of shapes and sizes, but which is preferably constructed to have an elongate rectangular cross-section so as to have a top 73, bottom 75 and four sides 77. The translucent plate may be made of any of the numerous light-transmitting materials, but which is preferably made of an acrylic or polycarbonate material for cost and weight reasons. The plate further includes one or more cavity 79' which are recesses which project upwardly from the translucent plate's bottom surface 75 towards the interior of the translucent plate. The cavities may be of any shape. However, they are preferably hemispherically or elliptically dome-shaped so as to appear circular when looked upon from the plate's upper side. The cavities may be entirely empty except for air. Alternatively, the cavities may be filled with a translucent or entirely transparent material. Alternatively, the material in the cavity may be colored and may be independently light producing, such as by including a phosphoric component which will tend to glow upon contact with light, even light out of the visual spectrum. Of importance, the translucent plate and one or more cavities form a plate-cavity interface 81 which, due to material properties and the curvature of the interface, will cause light to both reflect and refract when striking the interface 81.

A preferred light guide 49 of the present invention further includes a reflector 83. The reflector is positioned to cover the translucent plate's underside as well as cover the bottom of the cavities 79'. As shown in FIGS. 21-24, the reflector may also cover the sides 77 of the translucent plate. Moreover, the reflector may cover the translucent plate's upper surface, except for where holes 84 are formed directly over the light guides' cavities 79'. The reflector includes a highly reflective surface, and thus it is preferably mirrored, white, light grey, silver, metallic silver or metallic gold so that light striking the reflector will reflect off the reflector as opposed to be being absorbed or refracted. In addition, the reflector may incorporate glowing or phosphoric elements which will emit light upon experiencing light from another light source.

As shown in FIGS. 20-24, the light guide also includes one or more light sources 85, which are preferably LEDs. The LEDs are preferably positioned to project into recesses formed in the light guide's sides or top or bottom surfaces, as shown in FIG. 19. Alternatively, the light sources must be positioned near enough to the translucent plate so that light is received within its interior.

Figure 21:
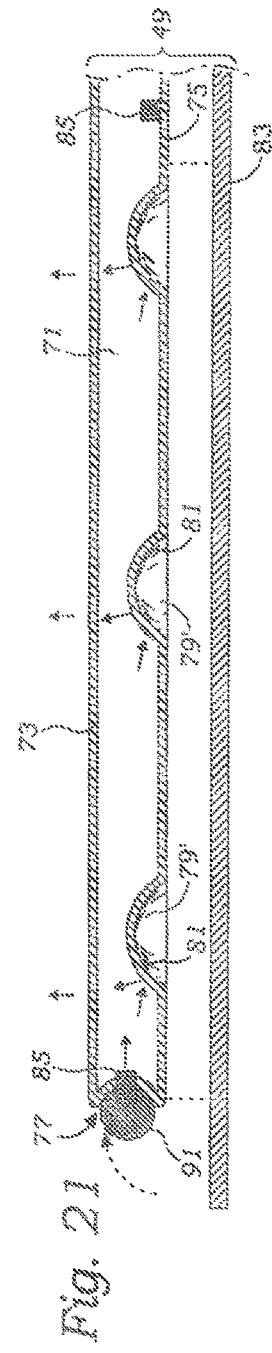
FIG. 21 is a side exploded cut-away view illustrating a light guide of the present invention.
Figure 22:
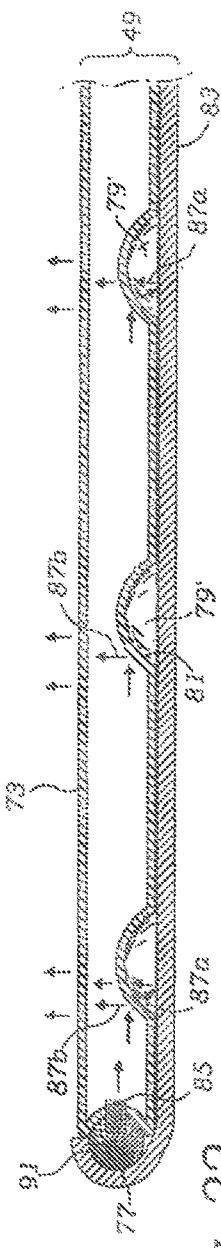
FIG. 22 is a side cut-away view illustrating a light guide of the present invention of FIG. 21.

With reference to FIGS. 21 & 22, light rays 87 are transmitted into and through the translucent plate 71 by LEDs 85. Thereafter, the light rays will tend to reflect off the translucent plate's top and bottom surfaces and sides, preferably with little absorption or loss as a result of a reflector 83 covering these regions, until the light strikes the plate-cavity interfaces 81. Depending on the angle of incidence between the light rays 87 and plate-cavity interfaces 81, and depending on various other factors such as the nature of the light, the material of the translucent plate and the possible presence of material within the cavity, the light will either reflect from the interface or refract into the cavity. As a result of its dome-like shape, the refracted light 87a will refract, in other words bend, downwardly through the cavity 79' until striking and reflecting off the reflector 83. The originally refracted and now reflected light will again refract into the translucent plate until it is transmitted from the translucent plate's top 73. Meanwhile, as a result of the cavities preferably dome-like shape, the reflected light 87b will also be directed upwardly until being transmitted from the translucent plate's upper surface immediately above the cavity 79'.

The reflection and refraction properties of the plate-cavity interface can be modified as can be determined by those skilled in the art. For example, polishing or roughening the plate cavity interface, such as by machining or sand blasting, can alter the refraction and reflection properties until optimal light transmission from the translucent plate's upper surface is obtained.

Figure 20:
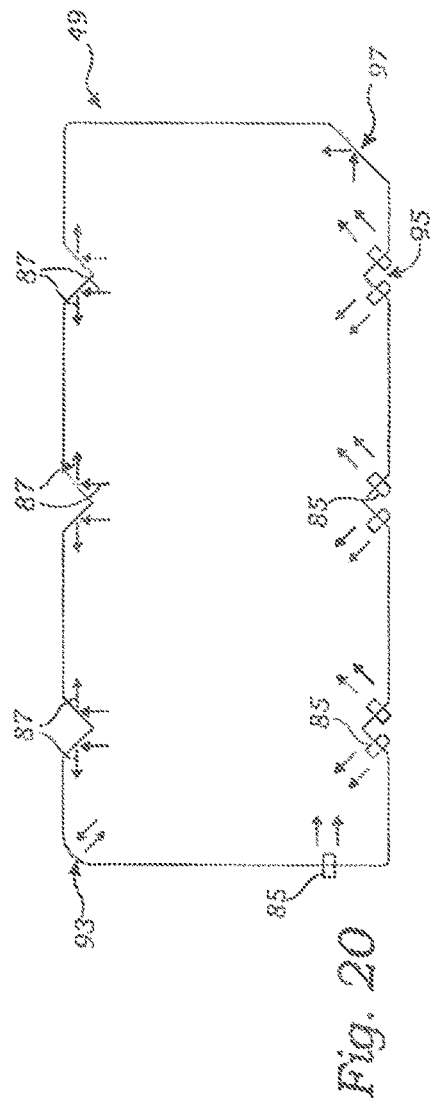
FIG. 20 is a top plan view of a light guide of the present invention which includes various modifications for increasing light transmission through the translucent sheet.

In addition to the traditional rectangular shape of the light guide shown in FIGS. 18-19, the light guide 49 may be modified to increase the transmission of light to areas of the light guide which are undesirably dim. For example, as shown in FIG. 20, one or more of the light guide's corners 93 may be rounded to reduce light loss that can occur in a sharp angled corner. In addition, one or more of the corner's 97 can be truncated at various angles to direct light to different regions of the light guide. In operation, and shown in FIG. 20, light rays emitted from LED's can be reflected off a truncated corner to far away areas of the keyboard where an LED is not in the vicinity. In addition to rounding or truncating the light guide's corners, the light guide can be machined or molded to include reflecting cut-outs 95, which can be in various shapes, for directing light to desired areas. For example, still with reference to FIG. 20, light transmitted from one side of light guide can be reflected with a "V" shaped cutout 95 to distribute light to far corners of the keyboard. Moreover, a cutout 95 can be used for placement or angling of the LEDs in order to emit light more uniformly within the light guide.

Still additional modifications can be made to the edge of the translucent sheet 71 to increase light transmission. For example, in a first embodiment, the edge is curved or rounded to provide a smooth exterior with no sharp edges so as to reduce light loss in a corner. Alternatively, as shown in FIGS. 18, 19 & 21-24, the edge is machined or molded to include a recess sized for receipt of any wires 91 used for supplying power to light sources 85. For this embodiment, it is preferred that any wires positioned within the edge recess be coated with a reflective material such as white paint or white plastic insulator. As shown in FIGS. 22-24, the reflector 83 may be positioned to cover the wire 91 to maintain it in place, and to reflect any light back into the interior of the translucent plate 71 that otherwise might escape.

As explained in much greater detail below, the light guides 49 of the present invention will have application for illuminating various structures, and particularly for illuminating the keys of a keyboard. For example, FIG. 23 illustrates a simplified keyboard having a plurality of keys members 11 and a translucent printed circuit board 21. Though not shown, the keyboard may include an upper clam shell member, a lower clam shell member, and a preferably translucent biasing means, such as an elastomeric diaphragm, for biasing the keys upward. The light source 85 emits light into the translucent plate 71 where it is reflected until striking the plate-cavity interface 81. Light is then reflected and refracted in the manner described above until being transmitted upwardly to the keys 11. As shown, the keyboard preferably includes an upper reflector 83 for further trapping the light until transmission to the key members through holes 84. As shown in FIG. 24, the light guide 49 of the present invention is also suitable for illuminating the keys for keyboards which incorporate membrane switch technology in which the circuit board 21 incorporates a plurality of flexible buttons which upon depression, activates a key. Membrane switch keyboards are commonly used for cellular telephones, remote controllers, ATM machines, etc.

As shown in FIGS. 23 and 24, the light producing cavities can be centered directly under the keys of a keyboard. However, alternatively, the cavities may be displaced off-center from directly below a key member. In particular, it has been found that displacing the light produced by the cavity 79' under a key approximately 1-5 millimeters can make the key characters, depending on their size and placement, to appear more luminous. Moreover, displacement of the cavities relative to the center of the key may be of particular importance where characters are offset from the center of the key, such as for function or number keys, or keys having multiple different characters such as the keyboard key showing a "!" and "1". Moreover, key members at the top of a keyboard are typically viewed at a greater angle to vertical than keys at the bottom of a keyboard. As a result in this change in angle, it has been found that displacing the light produced by the cavities 79' rearwardly for keys positioned toward the back of the keyboard will increase the apparent luminosity of the key characters. Thus, in a first embodiment, the light produced by the cavities 79' under the lower keys including shift, ctrl, spacebar and letters in the rows corresponding to z, x, c, a, s, d, etc. are not displaced relative to the key member center. However, the cavities, and light produced by them, are displaced rearwardly in keys at the top of the keyboard such as the function keys and number keys. In still an additional embodiment, the displacement of the cavities, and the light produced by them, increases incrementally from the bottom of the keyboard toward the top of the keyboard. Thus, as but an example, there may be no displacement of the cavities at the bottom row of the keyboard, but the cavities may be displaced rearwardly 1 millimeter in the second row from the bottom, 2 millimeters in the third row from the bottom, 3 millimeters in the fourth row from the bottom, etc. . . . As would be understood by those skilled in the art, the displacement of the light produced under keys can be applied to light guides and light sources other than those described herein.

FIGS. 25-29 illustrate an additional embodiment of an luminescent planar sheet which is ideal where the luminescent sheet needs to be particularly thin such as is required for laptop keyboards. The luminescent sheet includes a light guide 49 which does not include upwardly projecting cavities. Instead, the light guide 49 has a flat underside surface and reflective members 79" are positioned underneath each of the keys. As illustrated in the FIGS. 25-29, each reflective member 79" causes light, provided by LEDs 85 positioned along the sides of the light guide, to reflect upward toward each overlying key. The reflective members 79" may be made of paint or other coating applied upon the bottom of the light guide. Alternatively, the reflective member 79 may be comprised of thin reflective paper or plastic or the like. Still additional constructions for the reflective members may be devised by those skilled in the art.

Preferably, an additional reflective sheet 83 covers the underside of the light guide 49 as well as the reflective members 79". Also preferably, the reflective members 79" provide greater light diffusion than the reflector. In a preferred embodiment, the reflective members have a "flat" white appearance which is understood to provide high reflectivity and relatively good light diffusion. Preferably for this embodiment, the reflector has a "glossy" white appearance which is understood to provide excellent reflectivity but lower diffusion.

As illustrated in FIGS. 25-26, in preferred embodiments, the reflective members are reflective white circles or squares ¼-¾ inch across, with a preferred width of approximately ½ inch. The white reflective members are preferably "flat white" in appearance to provide light diffusion. The reflective members are then covered by a sheet of glossy paper, plastic or the like 83 having a mirrored, white, light grey, silver, metallic silver or metallic gold appearance which provides lesser diffusion than the overlying reflective members.

As shown in FIGS. 25-29, the reflector may also cover the sides 77 of the light guide 49. Moreover, the reflector may cover the translucent plate's upper surface, except for where holes are formed directly over the light guides' reflective members 79". The reflector includes a highly reflective surface, and thus it is preferably mirrored, white, light grey, silver, metallic silver or metallic gold so that light striking the reflector will reflect off the reflector as opposed to be being absorbed or refracted. Also for this embodiment, the reflector may incorporate glowing or phosphoric elements which will emit light upon experiencing light from another light source.

Figure 14:
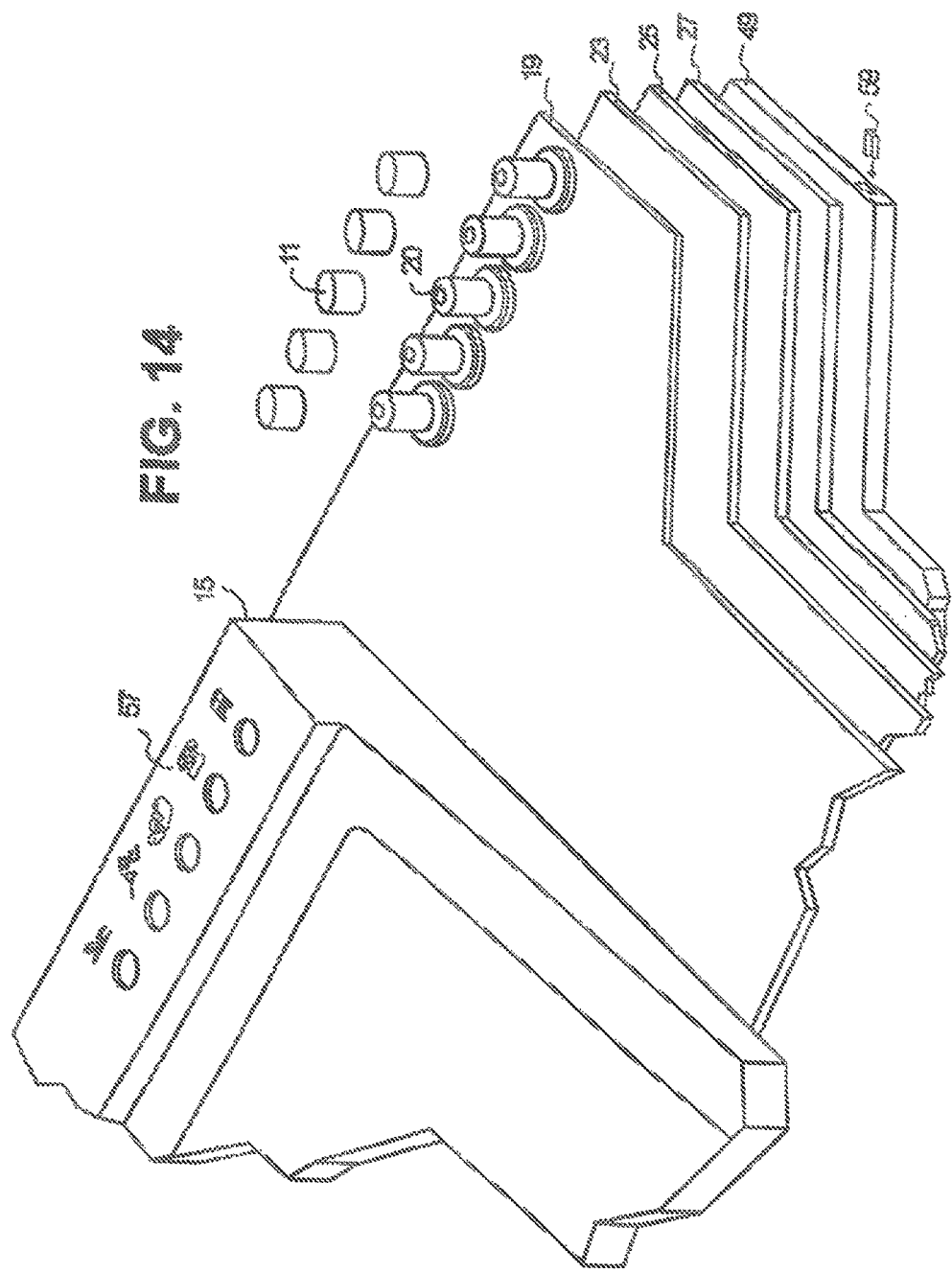
FIG. 14 is an exploded view of a keyboard having illuminated indicia in which the light source is a planar illuminating sheet positioned below the elastic diaphragm and circuit board of the keyboard.
Figure 15:
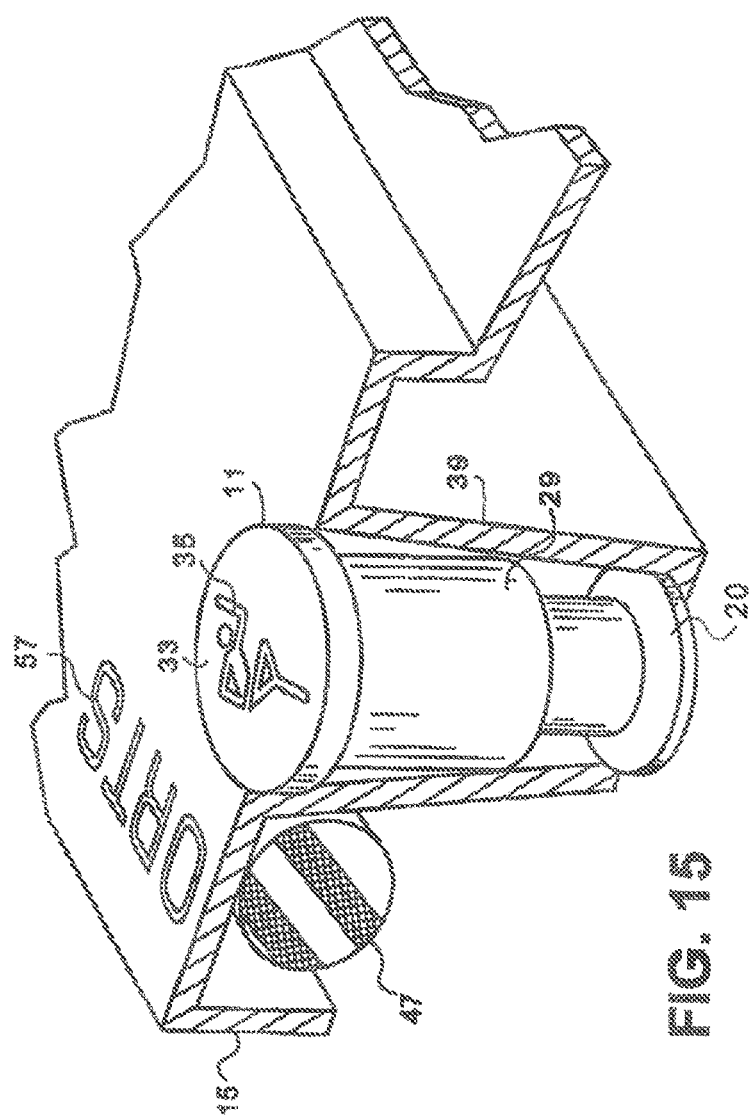
FIG. 15 is a cross-sectional view of a keyboard having illuminated indicia and illuminated key members whereby a light source is a light pipe positioned lateral to the key member and below the keyboard's upper clamshell member.

With reference to FIGS. 14 and 15, in still an additional embodiment of the invention, the keyboard's upper clamshell member includes illuminated indicia for identifying the function of one or more key members. Sometimes key members are too small for including symbols which are sufficiently large so as to be easily read by a keyboard operator. This is particularly true of the "function" keys which are often found at the top of a typical keyboard. These function keys include the traditional "F1-F12" keys, as well as "insert", "home", "delete", "end", "page up" and "page down" keys. Further, more and more keyboards are constructed to include "internet" keys which provide access to particular websites, and audio and video keys which control a computer's audio and video functions. In addition, keyboards are being constructed with more and more function keys, and the invention is not intended to be limited to the use of the function keys identified herein.

Unfortunately, these "function" keys are often constructed smaller than the "qwerty" letter keys. Due to their small size, it is often difficult to incorporate a symbol, or indicia, on the key members which can be easily read by the keyboard operator. Moreover, incorporating an illuminated symbol on these keys in accordance with FIGS. 4-13 can make the symbol even more difficult to read.

In order to overcome these disadvantages, in a preferred embodiment of the invention, the keyboard's upper clamshell member is constructed to include a region that is partially translucent. This region, constructed of a substantially translucent material, communicates light rays through the keyboard to display indicia indicating functions of one or more members. In similar fashion to the illumination of symbols shown in FIGS. 3 and 11, the clamshell indicia may be illuminated by light channeling through the upper clamshell to be emitted in the form of the indicia wherein an opaque coating or material is used to restrict the light to the shape of the indicia 57. Alternatively, larger portions of the clamshell member 15 can be illuminated while the symbol 57 remains opaque, depending on whether the symbol is intended to be illuminated as a positive or negative representation.

Moreover, the clamshell indicia may be illuminated using an illuminating planar sheet as shown in FIGS. 7-10, or the clamshell indicia may be illuminated using a light pipe as shown in FIGS. 11-13. For example, as shown in FIG. 14, in a first embodiment, the keyboard includes a diaphragm 19, first and second printed wiring layers 23 and 27, an insulator or dielectric layer 25, and a light channeling structure constructed as a substantially planar sheet 49. A light source 59, such as an LED, is provided for emitting light upwardly from the planar sheet 49, through the printed circuit board and elastic diaphragm so as to strike the underside of the upper clamshell member 15. The upper clamshell member includes translucent regions 57 to provide illuminated indicia for identifying the functions of the adjacent key members 11.

In an additional embodiment, a light pipe 47 is utilized to illuminate the clamshell indicia 57 and key members. As shown in FIG. 15, the indicia 57 reading "ORTS" is a portion of the complete word "SPORTS" for identifying the internet function of a key member 11 which provides access to an internet website dedicated to sports. The keyboard includes a clamshell member 15, illuminated indicia 57, key members 11, illuminated symbols 35, a biasing projection 20 and a light pipe 47. The light pipe 47 is attached to, or formed integral with, the upper clamshell member 15, adjacent to the hollow projections 39. The surface of the light pipe 47 is scratched or otherwise flawed so as to reflect light rays from the interior of the light pipe 47 to be emitted from the light pipe's 47 exterior surface. Light is emitted upwardly so as to illuminate the translucent regions 57 of the upper clamshell member.

With reference also to FIGS. 11-15, preferably light is also emitted laterally from the light pipe so as to strike the hollow projections 39. Preferably, the hollow projections 39 are constructed to include a portion that is at least partially translucent to allow light channeled by the light pipe 47 to project into the bores onto the key shafts 29 of the key members 11. Alternatively, the hollow projections 39 have openings (not shown) in their sidewalls to allow light to project laterally from the light pipe 47 through the openings and onto the exterior of the key shafts 29 of the key members 11. The light channeled by the light pipe 47 strikes the sides of the key shafts 29 and is transmitted through the translucent material of the key member 11 to be projected from the top of the key cap 31 in the form of a symbol 35.

The keyboard including illuminated clamshell indicia has been described primarily for use in connection with illuminating and identifying function keys. However, the invention is not intended to be limited thereto. For example, a keyboard having an upper clamshell member including illuminated indicia for identifying the "qwerty" key members is also within the scope of the invention.

Preferably, the key members are also constructed, at least partially, of a translucent material so that the key members illuminate. The key members may be constructed in various ways. For example, the keys may be substantially translucent with minimal coating except for symbols, such as letters on the keys, to provide a highly luminous key. However, preferably the keys are constructed in opposite manner in which the keys are substantially covered by an opaque material except for the symbols to provide key members including illuminated symbols for identifying their function. Where the key members are too small for readable markings, preferably the key members include an illuminated region, such as in the shape of a circle or star, for providing an indication as to the location of the key members.

In a preferred embodiment of the invention, translucent portions of the keyboard are coated on their exterior surfaces with a reflective opaque coating where light is not intended to be emitted. More particularly, it is preferred that the key members are coated with a paint such as light grey, white, silver, metallic silver, metallic gold, and other shiny metallic colors which substantially reflects visible light. Where the upper clamshell member is constructed of a translucent material, it is also preferred that the upper clamshell be coated with a material for reflecting visible light and reducing light absorption.

Though not shown in the figures, in still an additional preferred embodiment, the key caps and clamshell member include two layers of paint or the like. The initial first coating is a highly reflective material to reduce visible light absorption and reflect the light back into the translucent material until transmitted from the key caps. Meanwhile, a second coating of an alternative paint or other material is applied over the first coating. The second coating may also be reflective of visible light. However, it is preferred that the second coating reflects less visible light than the first coating, and preferably the second coating is a substantially non-reflective coating or color such as dark grey, black or blue. The keys can be made by sequentially application of coatings to translucent key members. The symbols, such as letters, are then formed on top of the key caps by using a laser or the like to cut away the excess material of both the first and second coatings to form the desired symbols. Key members are thus produced which include an enhanced contrast between the luminescent symbol and the substantially non-reflective regions of the key cap to provide enhanced readability for the keyboard user.

Luminescent keyboards have been created with luminescent key caps and opaque lettering, as well as their visual negative, opaque key caps with luminescent letters 35 such as illustrated in FIGS. 3-6. Keyboards with opaque key caps and luminescent letters are considered visually preferable. Unfortunately, this construction does not provide a luminescent indicator for the location of the space bar, and persons working in dark environments are not provided an indication as to the placement of the space bar. More specifically, all keys of a traditional keyboard, except for the space bar, include visual indicia identifying the function and placement of the key member. Even recently introduced "function" keys and Internet keys, typically include visual indicia which can be illuminated for identifying key functions and placement. However, the space bar does not have an accepted symbol or identifier for indicating its function, so prior art luminescent keyboards with opaque keys caps and luminescent letters have left the space bar completely opaque. This is particularly problematic because the space bar is the largest key member of a traditional keyboard, and people tend to look for this key member first when placing their fingers on a keyboard. This has not been a problem for key boards which have incorporated luminescent key caps and opaque letters as manufacturers have simply illuminated the entire space bar.

Figure 16:
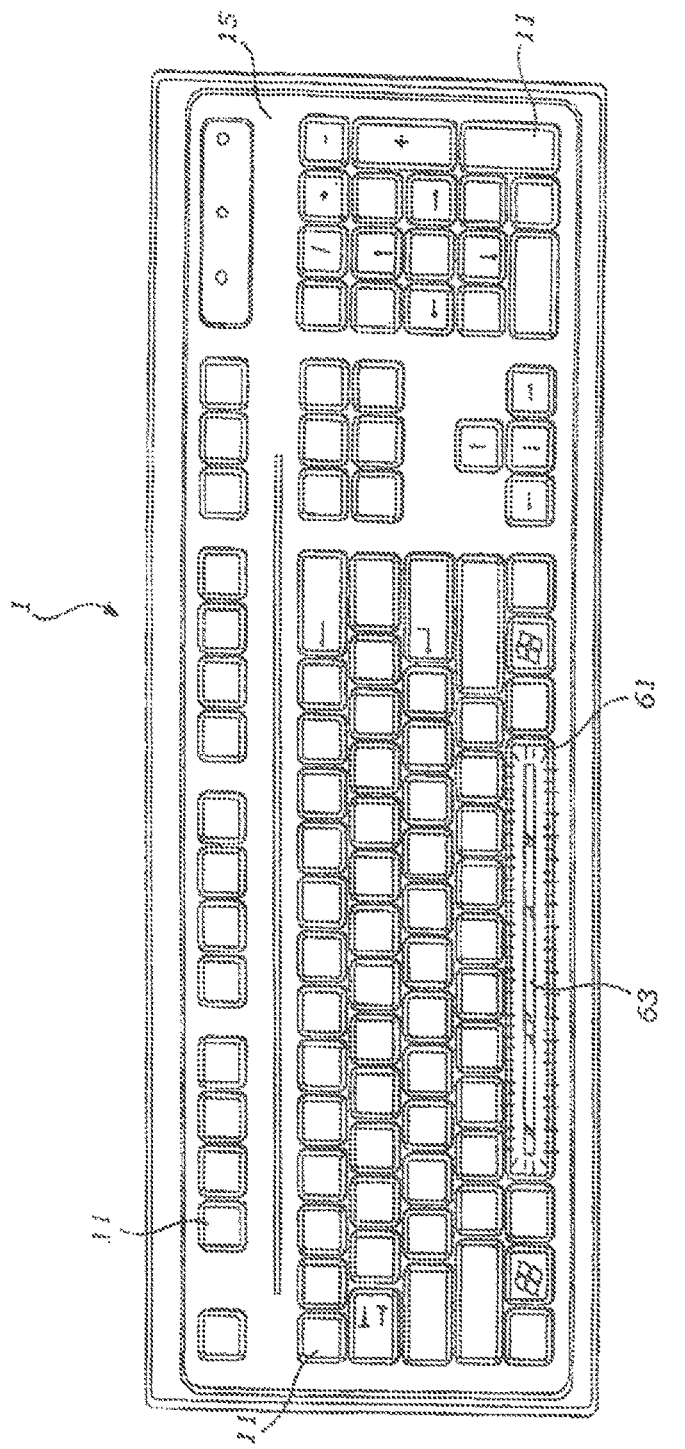
FIG. 16 is a to view of a keyboard having illuminated indicia wherein the space bar includes a luminescent line extending laterally across the key member.

With reference to FIG. 16, a preferred keyboard with opaque key caps and luminescent letters includes a space bar 61 with a luminescent line extending laterally across the top face of the space bar for indicating the space bar's function and position. The line may be dotted or dashed. Moreover, a plurality of laterally extending lines may be provided across the face of the space bar. However, as shown in FIG. 16, a single continuous luminescent line is considered preferable.

Figure 17:
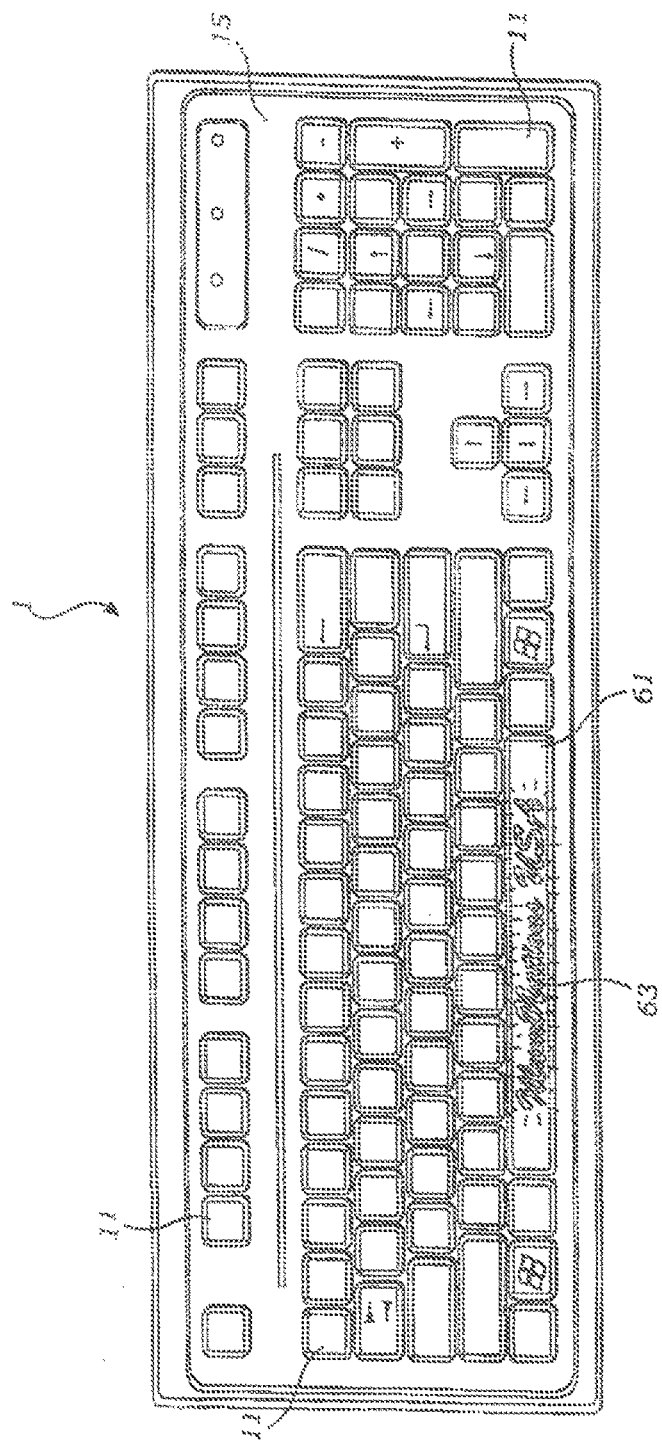
FIG. 17 is a to view of a keyboard having illuminated indicia wherein the space bar includes a luminescent decorative design in the form of a company trademark extending laterally across the key member.

As shown in FIG. 17, in an alternative embodiment of the invention for illuminating the space bar 61, the space bar includes a luminescent decorative design 65 for indicating the space bar's position. Preferably, and as illustrated in FIG. 17, the decorative design 65 is provided in the form of a manufacturer's or distributor's logo or trademark. As the largest key member of a traditional keyboard, and because the space bar does not include an accepted indicia for indicating its function, the space bar provides an ideal size and location for placement of a company's logo or design.

The present invention provides for an inexpensive and simple way to manufacture keyboards including illuminated indicia and keys having illuminated upper surfaces. The keyboard of the present invention is particularly suitable for use with computers and particularly with laptop computers, though it is not intended that the present invention be limited thereto. While several particular forms of the invention have been illustrated and described, it will be apparent that various modifications can be made without departing from the spirit and scope of the invention. Accordingly, it is not intended that the invention be limited except by the following claims.

I claim:

1. A light guide comprising:
an at least partially translucent light transmitting plate made of plastic having an upper surface, a lower surface and side surfaces;
at least twenty-six light transmitting cavities projecting into said lower surface of said plate, said twenty-six cavities each having an arcuate dome-shaped sidewall so that said cavities are hemispherical or hemi-ellipsoid in shape, the interface between said plate and said twenty-six cavities defining twenty-six plate-cavity interfaces;
a reflector covering at least a portion of said plate's lower surface and said twenty-six cavities; and a light source for communicating light through said plate; said interfaces being at least partially translucent for allowing light transmitted through said plate to refract through said interfaces into said cavities, and said cavities being at least partially translucent to permit light refracted into said cavities to reflect off said reflector to again refract through said interfaces to travel upwardly through said plate to transmit light from said plate's upper surface.

2. The light guide of claim 1 wherein said interfaces are partially reflective so as to reflect light from said light source upwardly through said plate to transmit light from said plate's upper surface.

3. The light guide of claim 1 wherein said reflector covers said side surfaces.

4. The light guide of claim 1 wherein said reflector covers said top surface except in places where light is to be emitted.

5. The light guide of claim 1 wherein said reflector is white, light grey, silver, metallic silver or metallic gold.

6. The light guide of claim 1 wherein said cavities are filled with air.

* * * * *